United States Patent
Yamashita et al.

(10) Patent No.: US 10,540,182 B2
(45) Date of Patent: Jan. 21, 2020

(54) PROCESSOR AND INSTRUCTION CODE GENERATION DEVICE

(71) Applicant: RENESAS ELECTRONICS CORPORATION, Tokyo (JP)

(72) Inventors: Hajime Yamashita, Tokyo (JP); Tatsuya Kamei, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 15/915,730

(22) Filed: Mar. 8, 2018

(65) Prior Publication Data

US 2018/0196675 A1 Jul. 12, 2018

Related U.S. Application Data

(63) Continuation of application No. 15/053,798, filed on Feb. 25, 2016, now Pat. No. 9,946,546.

(30) Foreign Application Priority Data

Feb. 26, 2015 (JP) ................. 2015-036296

(51) Int. Cl.
*G06F 9/38* (2018.01)
*G06F 12/0875* (2016.01)
*G06F 12/0862* (2016.01)

(52) U.S. Cl.
CPC .......... *G06F 9/3806* (2013.01); *G06F 9/3814* (2013.01); *G06F 12/0862* (2013.01); *G06F 12/0875* (2013.01); *G06F 2212/452* (2013.01)

(58) Field of Classification Search
None
See application file for complete search history.

(56) References Cited

U.S. PATENT DOCUMENTS

| 4,881,170 A | 11/1989 | Morisada |
| 5,317,701 A | 5/1994 | Reininger et al. |

(Continued)

FOREIGN PATENT DOCUMENTS

| JP | 63-503177 A | 11/1988 |
| JP | 02-242337 A | 9/1990 |
| JP | 10-283185 A | 10/1998 |

OTHER PUBLICATIONS

Notice of Allowance issued in corresponding parent U.S. Appl. No. 15/053,798, dated Dec. 14, 2017.

(Continued)

*Primary Examiner* — Eric Coleman
(74) *Attorney, Agent, or Firm* — McDermott Will & Emery LLP

(57) ABSTRACT

In a processor including an instruction prefetch buffer to prefetch a group of instructions with continuous addresses from a memory, the probability of occurrence of the situation where a bus is occupied by the instruction prefetch more than necessary is reduced. The processor includes an instruction fetch address generator which controls the address and amount of the instruction to be prefetched to the instruction prefetch buffer. The instruction fetch address generator includes a table which stores an instruction prefetch amount of an instruction to make the instruction prefetch buffer perform prefetching in association with a branch destination address of a branch arising in the process execution unit. When a branch arises in the process execution unit, the instruction fetch address generator makes an instruction prefetch buffer prefetch the instruction of the instruction prefetch amount corresponding to the branch destination address concerned including the branch destination address of the arisen branch.

6 Claims, 21 Drawing Sheets

(56) References Cited

U.S. PATENT DOCUMENTS

| | | | |
|---|---|---|---|
| 5,655,114 A | 8/1997 | Taniai et al. | |
| 5,889,985 A | 3/1999 | Babaian et al. | |
| 5,890,211 A * | 3/1999 | Sokolov | G06F 3/0676 |
| | | | 711/113 |
| 6,012,106 A * | 1/2000 | Schumann | G06F 12/0862 |
| | | | 710/22 |
| 6,425,023 B1 * | 7/2002 | Batchelor | G06F 13/4027 |
| | | | 710/33 |
| 6,425,124 B1 | 7/2002 | Tominaga et al. | |
| 6,560,693 B1 | 5/2003 | Puzak et al. | |
| 6,567,894 B1 * | 5/2003 | Hsu | G06F 12/0862 |
| | | | 711/137 |
| 6,684,319 B1 | 1/2004 | Mohamed et al. | |
| 6,704,860 B1 | 3/2004 | Moore | |
| 6,795,876 B1 * | 9/2004 | Solomon | G06F 13/4059 |
| | | | 710/311 |
| 6,799,263 B1 * | 9/2004 | Morris | G06F 9/3802 |
| | | | 711/119 |
| 6,957,327 B1 * | 10/2005 | Gelman | G06F 9/3844 |
| | | | 712/237 |
| 6,963,954 B1 * | 11/2005 | Trehus | G06F 12/0215 |
| | | | 711/137 |
| 6,976,147 B1 | 12/2005 | Isaac et al. | |
| 7,984,112 B2 * | 7/2011 | Huang | H04L 67/2847 |
| | | | 709/218 |
| 8,984,231 B2 * | 3/2015 | Sun | G06F 12/0862 |
| | | | 711/137 |
| 9,135,011 B2 * | 9/2015 | Manville | G06F 9/3806 |
| 2004/0243767 A1 | 12/2004 | Cierniak et al. | |
| 2010/0268894 A1 | 10/2010 | Kadambi et al. | |
| 2015/0149723 A1 | 5/2015 | Lin | |

OTHER PUBLICATIONS

Japanese Office Action issued in corresponding Japanese Patent Application No. 2015-036296, dated Sep. 25, 2018, with English Translation.

* cited by examiner

FIG. 5

| V | BRANCH DESTINATION ADDRESS | INSTRUCTION PREFETCH COUNT |
|---|---|---|
| V | BRANCH DESTINATION ADDRESS | INSTRUCTION PREFETCH COUNT |
| V | BRANCH DESTINATION ADDRESS | INSTRUCTION PREFETCH COUNT |
| ⋮ | ⋮ | ⋮ |
| V | BRANCH DESTINATION ADDRESS | INSTRUCTION PREFETCH COUNT |

FIG. 18

| V | Tag | Mask | INSTRUCTION PREFETCH COUNT |
|---|-----|------|---------------------------|
| V | Tag | Mask | INSTRUCTION PREFETCH COUNT |
| V | Tag | Mask | INSTRUCTION PREFETCH COUNT |
| ⋮ | ⋮ | ⋮ | ⋮ |
| V | Tag | Mask | INSTRUCTION PREFETCH COUNT |

| Tag | Mask | INSTRUCTION PREFETCH COUNT |
|---|---|---|
| 0x00 | 0xFC | 1 |
| 0x08 | 0xF8 | 4 |
| ⋮ | | |

PROCESSOR AND INSTRUCTION CODE GENERATION DEVICE

CROSS-REFERENCE TO RELATED APPLICATIONS

The is a continuation of U.S. patent application Ser. No. 15/053,798 filed Feb. 25, 2016, which claims the benefit of Japanese Patent Application No. 2015-036296 filed on Feb. 26, 2015 including the specification, drawings and abstract are incorporated herein by reference in their entirety.

BACKGROUND

The present invention relates to a processor and an instruction code generation device which generates an instruction code executable by the processor from a program described in a high level language. In particular, the present invention can be used suitably by a processor such as a microcomputer which has an instruction cache and prefetch function, and by a system using the processor.

In a processor including an instruction cache, the prefetch function is adopted widely, in order to prevent the degradation of processing capability due to a cache fill to be performed after a cache miss. The prefetch function predicts an instruction which the processor will execute in the future, and reads the instruction in advance to a prefetch buffer, such as an instruction cache, before a cache miss occurs. Various prefetch functions have been proposed, ranging from the simple prefetch function which reads an instruction at an address continuing the address of a currently executing instruction, to the high-performance prefetch function which is accompanied by branch prediction.

Patent Literature 1 discloses a processor which includes an FIFO (First-In First-Out) type prefetch buffer and which performs prefetching for every unit of instructions based on the word number of the instructions calculated by an instruction decoder. It is claimed that a system-wide bus efficiency can be enhanced by reducing the frequency of bus arbitration which takes place when an instruction is read into a prefetch buffer by the prefetch function.

(Patent Literature 1) Japanese Unexamined Patent Application Publication No. Hei 2 (1990)-242337

SUMMARY

Examination of Patent Literature 1 by the present inventors has revealed the following new issues.

When an instruction prefetch is performed to an instruction cache in place of an FIFO type prefetch buffer, the period of occupying a bus becomes longer because of a large amount of instructions to be read at a time. The FIFO type prefetch buffer performs the instruction prefetch in units of words with one word having one or two bytes. On the contrary, the cache line (often made in agreement with an entry size) as the unit of the cache fill in the instruction cache is 128 bytes, for example. If a processor including an instruction cache is configured so that a cache fill may be performed whenever an instruction of one cache line is performed and a cache miss occurs, degradation of the performance due to waiting for the cache fill is remarkable. Accordingly, it is effective to perform a speculative instruction prefetch to read plural lines in advance. Here, the count to perform the instruction prefetch, that is, the number of lines for which the cache fill is performed, is given by a fixed value or a register setup value. In cases where branch prediction is not accompanied, the instruction prefetch of plural lines is performed for the instruction of an address continuing the address of the currently executing instruction. At this time, it has been clarified that, if a fixed instruction prefetch count is adopted, there is a case in which the speculative instruction prefetch of an instruction which is not actually executed takes place. For example, when it is assumed that the instruction prefetch of two lines is performed in a fixed manner following a cache fill of one line accompanying a cache miss, even in cases where a branch occurs while executing the instruction included in the first line and the succeeding instruction is not executed, the succeeding instruction prefetch of two lines is not canceled but performed. In order to perform the succeeding instruction prefetch of two lines, a bus through which the cache fill is performed will be occupied and acquisition of the bus right for fetching an instruction of the branch destination address will be kept waiting.

Such an issue may occur not only in cases where the instruction prefetch buffer is configured with a cache memory, but may occur similarly in cases where an FIFO type prefetch buffer is employed.

The following explains a solution to such an issue. The other issues and new features of the present invention will also become clear from the description of the present specification and the accompanying drawings.

One embodiment according to the present application goes as follow.

That is, a processor including an instruction prefetch buffer to prefetch a group of instructions with continuous addresses from a memory further includes an instruction fetch address generator to control the address and instruction prefetch amount of an instruction to be prefetched to the instruction prefetch buffer. The instruction fetch address generator includes a table to store an instruction prefetch amount of an instruction to make the instruction prefetch buffer perform prefetching in association with a branch destination address of a branch arising in a process execution unit. When a branch arises in the process execution unit, the instruction fetch address generator makes the instruction prefetch buffer prefetch instructions of the instruction prefetch amount corresponding to the branch destination address concerned, including the branch destination address of the arisen branch.

The effect obtained by the one embodiment described above is explained briefly as follows.

It is possible to suppress low the probability of occurrence of the situation where a bus is occupied by the instruction prefetch more than necessary.

BRIEF DESCRIPTION OF THE DRAWINGS

FIG. 5 is a conceptual diagram illustrating an example of the configuration of an instruction prefetch count table with a full associative memory;

FIG. 18 is an explanatory drawing illustrating an example of the configuration of an entry by an associative memory of an instruction prefetch count table mounted in the instruction fetch address generator according to Embodiment 6;

DETAILED DESCRIPTION

1. Outline of Embodiment

Figure 1:
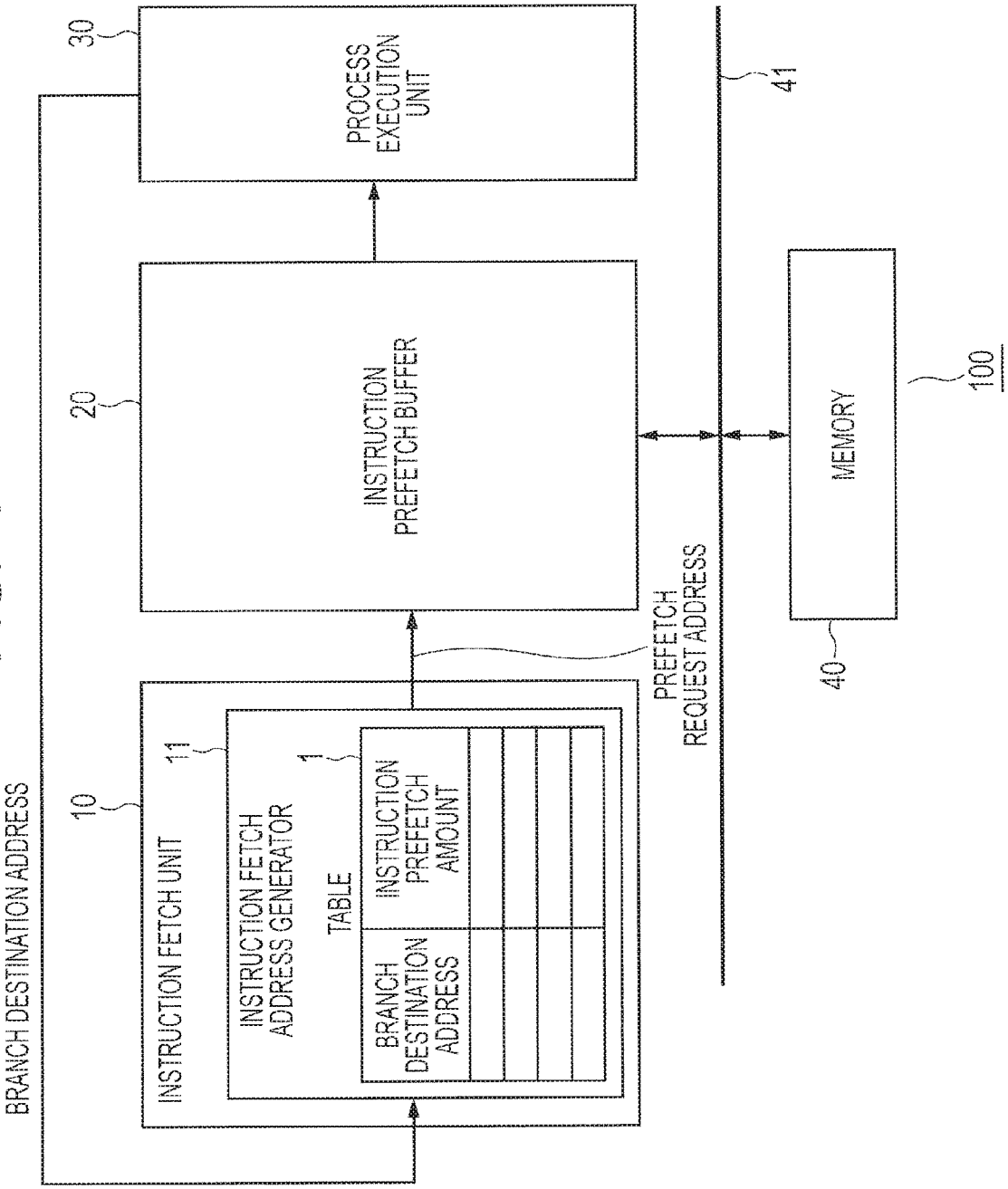
FIG. 1 is a block diagram illustrating an example of the configuration of a processor according to a typical embodiment.

First, an outline of a typical embodiment disclosed in the present application is explained. A numerical symbol of the drawing referred to in parentheses in the outline explanation about the typical embodiment only illustrates what is included in the concept of the component to which the numerical symbol is attached.

(1) <An Instruction Prefetch Amount Management Table>

The typical embodiment disclosed in the present application is a processor (100) which includes an instruction prefetch buffer (20) to prefetch a group of instructions with continuous addresses from a memory (40), a process execution unit (30) to read an instruction from the instruction prefetch buffer and to execute the instruction, and an instruction fetch address generator (11). The configuration is as follows.

The instruction fetch address generator is provided with a table (1, 2, 3) which stores an instruction prefetch amount of an instruction to make the instruction prefetch buffer perform prefetching in association with a branch destination address of a branch arising in the process execution unit. When a branch arises in the process execution unit, the instruction fetch address generator calculates an instruction prefetch amount corresponding to the branch destination address of the arisen branch, with reference to the table, and makes the instruction prefetch buffer prefetch instructions of the instruction prefetch amount calculated, including the instruction of the branch destination address concerned (4-7).

According to this configuration, it is possible to suppress low the probability of occurrence of the situation where a bus (41) is occupied by the instruction prefetch more than necessary.

(2) <A Dynamic Table>

In Paragraph 1, when a branch arises in the process execution unit, the instruction fetch address generator rewrites the instruction prefetch amount corresponding to the branch destination address concerned of the table (2), based on the difference between the branch destination address of the arisen branch and an address of a branch arising next to the branch concerned.

According to this configuration, the instruction prefetch amount is learned based on the branch which actually occurs; accordingly, it is possible to predict a proper instruction prefetch amount with a higher degree of accuracy.

(3) <A Static Table>

In Paragraph 1, when the process execution unit executes a specified instruction, the branch destination address and the corresponding instruction prefetch amount are written in the table (3).

According to this configuration, as for exceptional treatments which do not occur frequently, such as interruption, when it is difficult to expect that an instruction prefetch amount is dynamically calculated as in Paragraph 2, or when it is difficult to expect that the instruction prefetch amount calculated dynamically is held until it is referred to next (when it spills out), it is possible to supply a suitable instruction prefetch amount surely. It is also possible to calculate properly the instruction prefetch amount by off-line analysis of a program or by software such as an operating system.

(4) <A Static Table+a Dynamic Table>

In Paragraph 3, the table is defined as a static table (3). The instruction fetch address generator is further provided with a dynamic table (2) to store an instruction prefetch amount of an instruction to make the instruction prefetch buffer perform prefetching in association with a branch destination address of a branch arising in the process execution unit. When a branch arises in the process execution unit, the instruction fetch address generator rewrites the instruction prefetch amount corresponding to the branch destination address concerned of the dynamic table, based on the difference between the branch destination address of the arisen branch and an address of a branch arising next to the branch concerned. When a branch arises in the process execution unit, the instruction fetch address generator calculates the instruction prefetch amount corresponding to the branch destination address of the arisen branch, with reference to at least one of the static table and the dynamic table (15), and makes the instruction prefetch buffer prefetch instructions of the instruction prefetch amount calculated, including the instruction of the branch destination address concerned (4-7).

According to this configuration, it is possible to make proper use of the dynamic table (2) with the learning function according to Paragraph 2 and the static table (3) according to Paragraph 3. For example, since exceptional treatments, such as an interruption processing, do not occur frequently, if the branch destination address accompanying these exceptional treatments is managed with a dynamic table, it is likely that the branch destination address may be overwritten and eliminated (spilt out) in the process of learning about the branch which occurs frequently. Therefore, it is configured such that the instruction prefetch amount corresponding to the branch destination address accompanying an exceptional treatment is managed with the use of the static table, and such that even if a branch by an exceptional treatment actually occurs, the instruction prefetch amount at that time is not written in the dynamic table. According to this configuration, the branch destination address accompanying the exceptional treatment which does not occur frequently is managed with the use of the static table without spilling-out, and the branch which occurs frequently is managed with the use of the dynamic table which learns based on the branch which occurs actually; accordingly, it is possible to prefetch instructions of the suitable instruction prefetch amount to the static table and the dynamic table, respectively.

(5) <A Dynamic Table+a Branch Prediction Unit>

In Paragraph 2, the instruction fetch address generator further includes a branch prediction unit (19). When a branch arises in the process execution unit and the branch prediction by the branch prediction unit is successful, the instruction fetch address generator stops the rewrite of the instruction prefetch amount corresponding to the branch destination address concerned to the table.

According to this configuration, it is possible to suppress unnecessary occupancy of an entry in the dynamic table. When the branch prediction is successful, the bus is not occupied more than necessary because the instruction prefetch is performed based on the branch prediction. Accordingly, it is not necessary to use the dynamic table.

(6) <An Instruction Prefetch Count Table>

The typical embodiment disclosed in the present application is a processor (100) which includes an instruction cache (20), a process execution unit (30), and an instruction fetch address generator (11). The configuration is as follows.

The instruction cache holds plural lines comprised of a prescribed number of instruction codes per line, and prefetches one line of instruction codes from a memory (40) for every instruction prefetch request address supplied from the instruction fetch address generator.

The process execution unit reads an instruction comprised of a prescribed number of instruction codes from the instruction cache and executes the instruction.

The instruction fetch address generator is provided with an instruction prefetch count table (1, 2, 3) to store an instruction prefetch count to make the instruction cache perform prefetching in association with a branch destination address of a branch arising in the process execution unit.

When a branch arises in the process execution unit, the instruction fetch address generator calculates an instruction prefetch count corresponding to an instruction prefetch request address including the branch destination address of the risen branch, with reference to the instruction prefetch count table. The instruction fetch address generator supplies sequentially to the instruction cache the instruction prefetch request addresses, continuing from the instruction prefetch request address concerned and corresponding in number to the calculated instruction prefetch count.

According to this configuration, it is possible to suppress low the probability of occurrence of the situation where a bus (41) is occupied by the instruction prefetch more than necessary.

(7) <A Dynamic Instruction Prefetch Count Table>

In Paragraph 6, when a branch arises in the process execution unit, the instruction fetch address generator rewrites the instruction prefetch count corresponding to the branch destination address concerned of the instruction prefetch count table (2), based on the difference between the branch destination address of the arisen branch and an address of a branch arising next to the branch concerned.

According to this configuration, the instruction prefetch count is learned based on the branch which actually occurs; accordingly, it is possible to predict a proper instruction prefetch amount with a higher degree of accuracy.

(8) <Calculation of an Instruction Prefetch Count from the Difference of Addresses>

In Paragraph 7, the process execution unit is provided with a branch request unit (33) to supply, when a branch arises, a branch source address and a branch destination address of the arisen branch to the instruction fetch address generator.

The instruction fetch address generator holds the supplied branch destination address, and rewrites an instruction prefetch count held in the instruction prefetch count table and corresponding to the branch destination address, based on the difference obtained by subtracting the branch destination address currently held from the branch source address supplied when a branch arises next to the branch concerned.

According to this configuration, the instruction prefetch count is calculated from the difference between the branch destination address and the address at which an instruction of the next arising branch is arranged (a branch source address of the next branch). Accordingly, it is possible to learn the instruction prefetch count correctly.

(9) <A Branch Request Unit Calculates an Instruction Prefetch Count by a Counter>

In Paragraph 7, the process execution unit is provided with a branch request unit (33).

When a branch arises in the process execution unit, the branch request unit supplies the branch source address of the arisen branch, to the instruction fetch address generator.

The branch request unit includes a counter (34) to start counting when a branch arises in the process execution unit, and to count the number of times that the address of the instruction executed by the process execution unit has exceeded the address boundary corresponding to one line of the instruction cache, and the branch request unit supplies the count value at the time when a branch arises next to the branch concerned, to the instruction fetch address generator, as an inter-branch distance.

The instruction fetch address generator holds the supplied branch destination address (12), and rewrites the instruction prefetch count corresponding to the branch destination address held, based on the inter-branch distance supplied when a branch arises next to the branch concerned.

According to this configuration, the instruction prefetch count is calculated by the counter (34) in the branch request unit. Accordingly, it is possible to learn the instruction prefetch count correctly by a small circuit scale.

(10) <An Instruction Fetch Address Generator Calculates an Instruction Prefetch Count by a Counter>

In Paragraph 7, the process execution unit is provided with a branch request unit (33).

When a branch arises in the process execution unit, the branch request unit supplies the branch source address of the arisen branch, to the instruction fetch address generator.

The instruction fetch address generator includes a register (12) to hold the supplied branch destination address, and a counter (14) to start counting when the branch destination address is supplied, and to count the number of times of supplying an instruction prefetch request address to the instruction cache. The instruction fetch address generator writes the count value of the counter when the next branch destination address is supplied following the branch concerned, to the instruction prefetch count table as an instruction prefetch count corresponding to the branch destination address held at the register.

According to this configuration, the instruction prefetch count is calculated by the counter (14) in the instruction fetch address generator. Accordingly, it is possible to learn the instruction prefetch count correctly by the circuit scale smaller than the configuration of Paragraph 8. The instruction prefetch count calculated (counted) becomes equal to or greater than the instruction prefetch count calculated (counted) by the configuration of Paragraph 9. Accordingly, more speculative fetches are performed and the probability of the instruction cache hit increases.

(11) <A Static Instruction Prefetch Count Table>

In Paragraph 6, when the process execution unit executes a specified instruction, the branch destination address and the corresponding instruction prefetch count are written in the instruction prefetch count table (3).

According to this configuration, as for exceptional treatments which do not occur frequently, such as interruption, when it is difficult to expect that an instruction prefetch count is dynamically calculated as in Paragraph 7 to Paragraph 10, or when it is difficult to expect that the instruction prefetch count calculated dynamically is held until it is referred to next (when it spills out), it is possible to supply a suitable instruction prefetch count surely. It is also possible to calculate properly the instruction prefetch count by off-line analysis of a program or by software such as an operating system and to write it in the static instruction prefetch count table.

(12) <A Static Instruction Prefetch Count Table+a Dynamic Instruction Prefetch Count Table>

In Paragraph 11, the instruction prefetch count table is defined as a static instruction prefetch count table (3).

The instruction fetch address generator further includes a dynamic instruction prefetch count table (2), and when a branch arises in the process execution unit, the instruction fetch address generator rewrites the instruction prefetch count corresponding to the branch destination address concerned of the dynamic instruction prefetch count table, based on the difference between the branch destination address of the arisen branch and an address of a branch arising next to the branch concerned.

When a branch arises in the process execution unit, the instruction fetch address generator calculates the instruction prefetch count corresponding to the branch destination address of the arisen branch with reference to at least one of the static instruction prefetch count table and the dynamic instruction prefetch count table (15). The instruction fetch address generator supplies sequentially to the instruction cache the instruction prefetch request address including the branch destination address of the arisen branch, and the instruction prefetch request addresses which continue from the instruction prefetch request address concerned and corresponds in number to the calculated instruction prefetch count (4-7).

According to this configuration, it is possible to make proper use of the dynamic instruction prefetch count table with the learning function of Paragraph 7 and the static instruction prefetch count table of Paragraph 11 which can support exceptional treatments which do not occur frequently, thereby, the same effect as in Paragraph 4 is produced.

(13) <A Dynamic Instruction Prefetch Count Table+a Branch Prediction Unit>

In one of Paragraph 7 to Paragraph 10, the instruction fetch address generator further includes a branch prediction unit (19). When a branch arises in the process execution unit and the branch prediction by the branch prediction unit is successful, the instruction fetch address generator stops the rewrite of the instruction prefetch amount corresponding to the branch destination address concerned of the instruction prefetch count table.

According to this configuration, it is possible to suppress unnecessary occupancy of an entry in the dynamic instruction prefetch count table. The reason is as follows. When the branch prediction is successful, the bus is not occupied more than necessary because the instruction prefetch is performed based on the branch prediction. Accordingly, it is not necessary to use the dynamic instruction prefetch count table.

(14) <An Instruction Prefetch Count Table is an Associative Memory>

In one of Paragraph 6 to Paragraph 13, the instruction prefetch count table is an associative memory which is supplied with the branch destination address and outputs the corresponding instruction prefetch count.

According to this configuration, it is possible to implement the instruction prefetch count table using the design resources of the well-known associative memory, thereby facilitating the design. The associative memory may be a full associative type or a set associative type.

(15) <An Instruction Prefetch Count Table is an Associative Memory with a Mask>

In Paragraph 14, the associative memory functioning as the instruction prefetch count table includes plural entries each comprised of a tag, a mask, and an instruction prefetch count. The associative memory outputs the instruction prefetch count stored in an entry which is in agreement with the tag when a part of bits of the branch destination address inputted are cancelled by the mask, as an instruction prefetch count corresponding to the inputted branch destination address (18).

According to this configuration, it is possible to suppress small the circuit scale (number of entry) of the associative memory which functions as the instruction prefetch count table. This is because plural branch destination addresses which output the same instruction prefetch count can be collectively registered to one entry.

(16) <An Instruction Code Generation Device>

The typical embodiment disclosed in the present application is an instruction code generation device (50) to generate an instruction code of a program (61) supplied to a processor (100) which includes an instruction prefetch buffer (20) and an instruction fetch address generator (11). The configuration is as follows.

The instruction fetch address generator is provided with a table (1, 2, 3) to store an instruction prefetch amount of an instruction to make the instruction prefetch buffer perform prefetching in association with a branch destination address of an arisen branch. When a branch arises, the instruction fetch address generator makes the instruction prefetch buffer prefetch instructions of the instruction prefetch amount corresponding to the branch destination address concerned, including the branch destination address of the arisen branch.

The instruction code generation device generates an executable instruction code (64) from the program, and calculates the instruction prefetch amount corresponding to the branch destination address concerned, based on the difference between the branch destination address of the branch instruction and an address of the next branch instruction arranged in the instruction code.

According to this configuration, it is possible to add function to the instruction code generation device including a linker which generates the instruction code executable by the processor, the function being to generate the information (a branch destination address, and an instruction prefetch amount or an instruction prefetch count) for writing in the static table described in Paragraphs 3 and 4 or the static instruction prefetch count table described in Paragraphs 11 and 12. The information generated by the instruction code generation device to associate the branch destination address and the instruction prefetch amount or the instruction prefetch count may be written in the dynamic table described in Paragraphs 1 and 2 and Paragraphs 4 and 5, or in the dynamic instruction prefetch count table described in Paragraphs 6 to 10 and Paragraphs 12 to 15, as an initial value.

(17) <An Instruction Prefetch Buffer is an Instruction Cache>

In Paragraph 16, the instruction prefetch buffer is an instruction cache (20), and the instruction prefetch amount is specified by the instruction prefetch count to prefetch the instruction code to the cache line of the instruction cache.

According to this configuration, it is possible to supply properly the instruction prefetch count as the instruction prefetch amount to the processor in which the instruction prefetch buffer is implemented with the cache memory.

(18) <A Table is an Associative Memory with a Mask>

In Paragraph 17, the table is an associative memory which includes plural entries each comprised of a tag, a mask, and an instruction prefetch count, and outputs the instruction prefetch count stored in an entry which is in agreement with the tag when a part of bits of the branch destination address inputted are cancelled by the mask, as an instruction prefetch count corresponding to the inputted branch destination address.

The instruction code generation device performs the address mapping of the instruction code so as to arrange plural branch destination addresses having the same value of the corresponding instruction prefetch count, in the address space in which some address bits are common. Next, the instruction code generation device comprises one entry to be supplied to the associative memory, by defining the common address bit as a tag, a bit string which cancels the other address bits as a mask, and the same value as an instruction prefetch count.

According to this configuration, it is possible to suppress small the circuit scale (number of entry) of the associative memory which functions as an instruction prefetch count table. The instruction code generation device can generate the information in order to register to one entry collectively plural branch destination addresses which output the same instruction prefetch count.

(19) <A Compiler+a Linker>

In one of Paragraph 16, Paragraph 17, and Paragraph 18, the instruction code generation device includes a compiler (51), a library object file (63), and a linker (52). The compiler is supplied with a program (61) described in the high level language and generates an object file (62). The linker generates an executable instruction code (64) from the object file (62) generated by the compiler and the library object file. The linker calculates and outputs an instruction prefetch amount (65) corresponding to a branch destination address.

According to this configuration, the function to calculate the instruction prefetch amount corresponding to the branch destination address is included in the integrated program development environment which includes the ordinary compiler and linker, and it is possible to automate and provide the function concerned.

2. Details of Embodiment

The embodiment is further explained in full detail.

(Embodiment 1)

<An Instruction Prefetch Amount Management Table>

FIG. 1 is a block diagram illustrating an example of the configuration of a processor 100 according to a typical embodiment. The processor 100 includes an instruction fetch unit 10, an instruction prefetch buffer 20, a process execution unit 30, and a memory 40. The instruction prefetch buffer 20 and the memory 40 are coupled mutually via a bus 41. The instruction prefetch buffer 20 prefetches a group of instructions with continuous addresses from the memory 40 via the bus 41. The process execution unit 30 reads an instruction from the instruction prefetch buffer 20 and executes the instruction.

Although not shown in the figure, for load/store of data, it is preferable that the process execution unit 30 and the memory 40 may be mutually coupled by the same memory 40 and the bus 41, or they may be mutually coupled by other memory and other bus (data bus), independently from instructions. The bus 41 may be hierarchized. Although not limited in particular, having the configuration in which a memory is included on-chip or externally, the processor 100 is formed on a single semiconductor substrate, such as silicon, using a well-known CMOS (Complementary Metal-Oxide-Semiconductor field effect transistor) integrated circuit manufacturing technology, for example. The signal shown in FIG. 1 is a digital signal of one bit or multi bits using one or plural wires. However, the bus notation is omitted. These points are similarly applied to other embodiments disclosed by the present application, and other block diagrams to be quoted.

The instruction fetch unit 10 is provided with an instruction fetch address generator 11. The instruction fetch address generator 11 includes a table 1 which stores an instruction prefetch amount of an instruction to make the instruction prefetch buffer 20 perform prefetching, in association with a branch destination address of a branch arising in the process execution unit 30. When a branch arises in the process execution unit 30, the branch destination address of the arisen branch is supplied to the instruction fetch address generator 11 of the instruction fetch unit 10. The instruction fetch address generator 11 reads the instruction prefetch amount corresponding to the supplied branch destination address, with reference to the table 1. The instruction fetch address generator 11 makes the instruction prefetch buffer 20 prefetch the instruction of the read instruction prefetch amount from the memory 40, by the method of generating an instruction prefetch request address.

According to this configuration, it is possible to set the suitable instruction prefetch amount properly, depending on the branch destination address. Therefore, it is possible to suppress low the probability of occurrence of the situation where the bus 41 is occupied by the instruction prefetch more than necessary.

Figure 2:
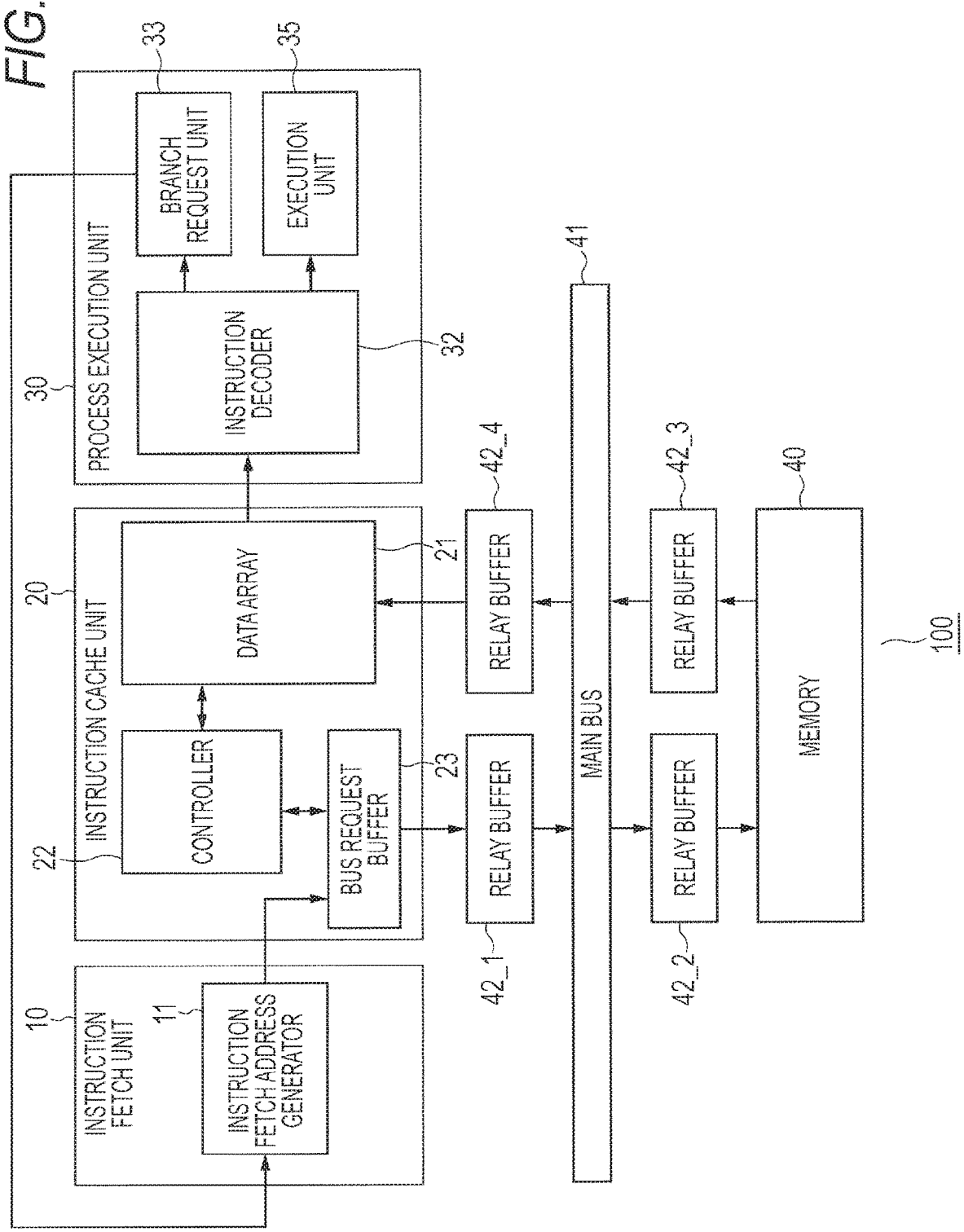
FIG. 2 is a block diagram illustrating an example of the configuration of the whole processor.

FIG. 2 is a block diagram illustrating an example of the configuration of the whole processor 100.

The instruction prefetch buffer 20 is realized by a cache memory, and includes a data array 21, a controller 22, and a bus request buffer 23 (called as an instruction cache unit 20). The data array is configured with plural entries, and a cache line per one entry is 128 bytes and includes plural instruction codes. The controller 22 is what is called a cache controller. The controller 22 determines whether an instruction code of an address requested is stored in the data array 21. When stored, it is a cache hit and the instruction code is supplied to the process execution unit 30. When not stored, it is a cache miss and the instruction code of one cache line including the address is read from the memory 40 to the data array 21 (to accomplish a cache fill). The read request of data to the memory 40 accompanying the cache miss is buffered in the bus request buffer 23. Whenever a bus right is acquired, the bus request buffer 23 issues sequentially the read request buffered to the bus 41.

The instruction cache unit 20 and the memory 40 are coupled via the main bus 41. Depending on the magnitude of the load of the main bus 41 and the required access frequency, relay buffers 42_1 through 42_4 each configuring a pipeline are provided between the instruction cache unit 20 and the main bus 41 and between the main bus 41 and the memory 40. The number of stages and configuration of this relay buffer are decided by the magnitude of the load of the main bus 41, the required access frequency (throughput), and the latency.

The process execution unit 30 includes an instruction decoder 32, a branch request unit 33, and an execution unit 35. The instruction decoder 32 decodes and interprets an instruction code of the instruction supplied from the instruction cache 20, and controls the branch request unit 33 and the execution unit 35 according to the instruction. The execution unit 35 is configured for example with a load/store instruction execution unit and an arithmetic execution unit. The branch request unit 33 performs the conditional branch and unconditional branch depending on the calculation result of the execution unit 35, and issues a branch destination address to the instruction fetch unit 10. Usually, a branch request is issued together with the branch destination address.

In Embodiment 1, the instruction fetch address generator 11 includes the table 1 which stores the instruction prefetch amount of the instruction which makes the instruction prefetch buffer 20 (the instruction cache unit 20) prefetch, in association with the branch destination address as described above. Therefore, it is possible to set a suitable instruction prefetch amount properly, depending on a branch destination address.

<An Instruction Prefetch Count Table>

The instruction prefetch buffer 20 is realized, for example, by the instruction cache unit 20 as described above, and the instruction prefetch amount can be specified by the count of the cache fill. In the following, the explanation is made by comparing a comparative example in which the instruction prefetch amount is fixed independently of the branch destination address, and the present embodiment in which the instruction prefetch amount is properly specified depending on the branch destination address.

Figure 3:
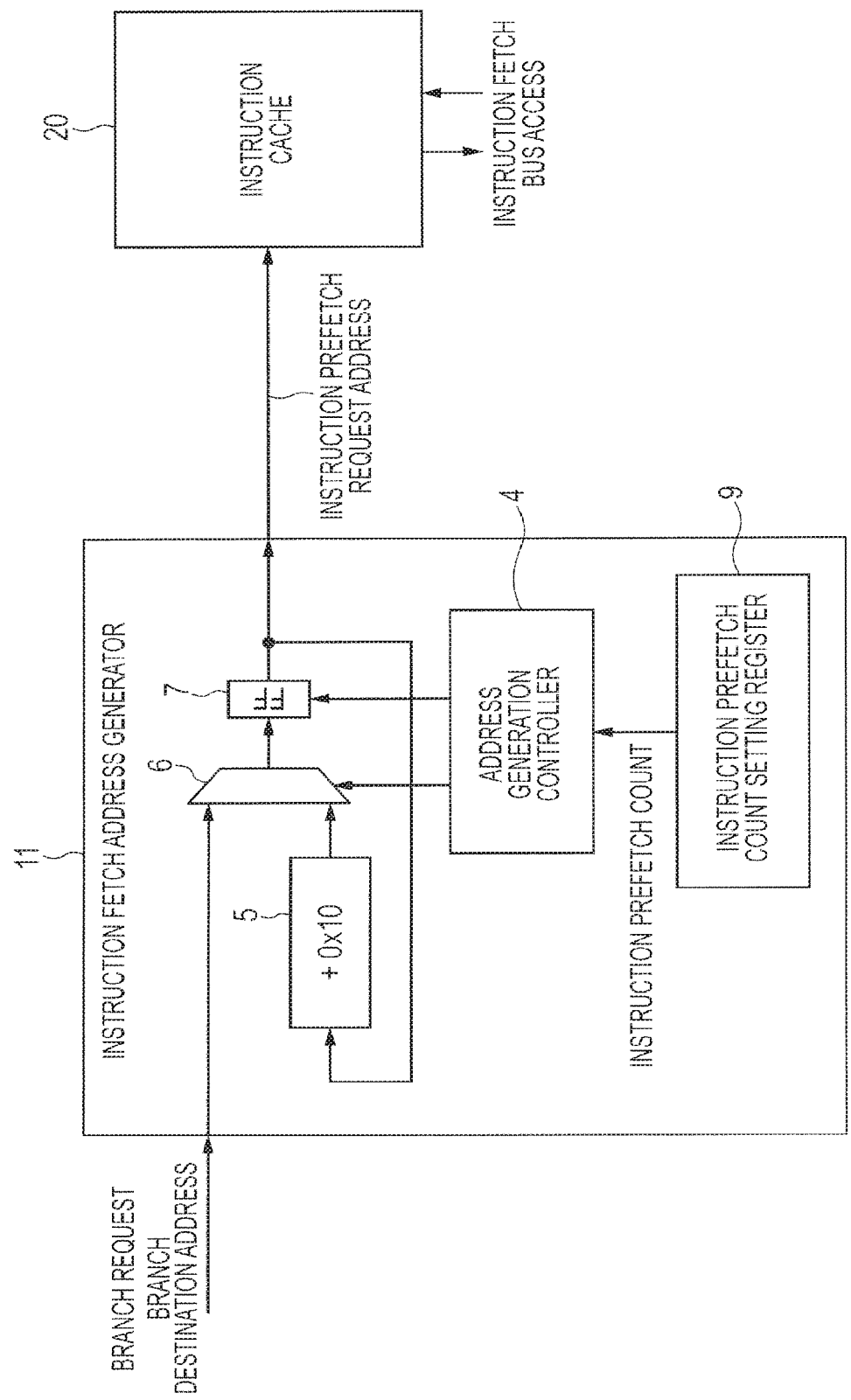
FIG. 3 is a block diagram illustrating the configuration of an instruction fetch address generator in a processor of a comparative example.

FIG. 3 is a block diagram illustrating an example of the configuration of an instruction fetch address generator 11 of a processor according to the comparative example. The instruction fetch address generator 11 includes a flip-flop 7, a selector 6, an address adder 5, an address generation controller 4, and an instruction prefetch count setting register 9. When a branch arises in the process execution unit 30, a branch destination address and a branch request are supplied to the instruction fetch address generator 11. The supplied branch destination address is stored in the flip-flop 7 via the selector 6, and is supplied to the instruction cache 20 which functions as an instruction prefetch buffer. When the branch destination address hits in the instruction cache 20 (cache hit), the corresponding instruction code is read and supplied to the process execution unit 30. When the branch destination address does not hit in the instruction cache 20 (cache miss), a cache fill is performed and the corresponding instruction code is read and supplied to the process execution unit 30.

The branch destination address is incremented by the address adder 5 in parallel with this, and the value held at the flip-flop 7 is updated. The amount of the increment is equivalent to one cache line, and the addition in the address adder 5 is 0x10, for example. Here, "0xYY" indicates that YY is the number of two digits in the hexadecimal notation (same in the present application specification). The value incremented from the branch destination address is supplied to the instruction cache 20 as an instruction prefetch request address, and it is prefetched from the memory 40 in the case of the cache miss. The address generation controller 4 controls the repetition of the increment operation. In the comparative example, the increment is repeated as many as the instruction prefetch count supplied from the instruction prefetch count setting register 9, an instruction prefetch request address is issued each time, and the instruction prefetch corresponding to the count is performed by the instruction cache 20.

Figure 4:
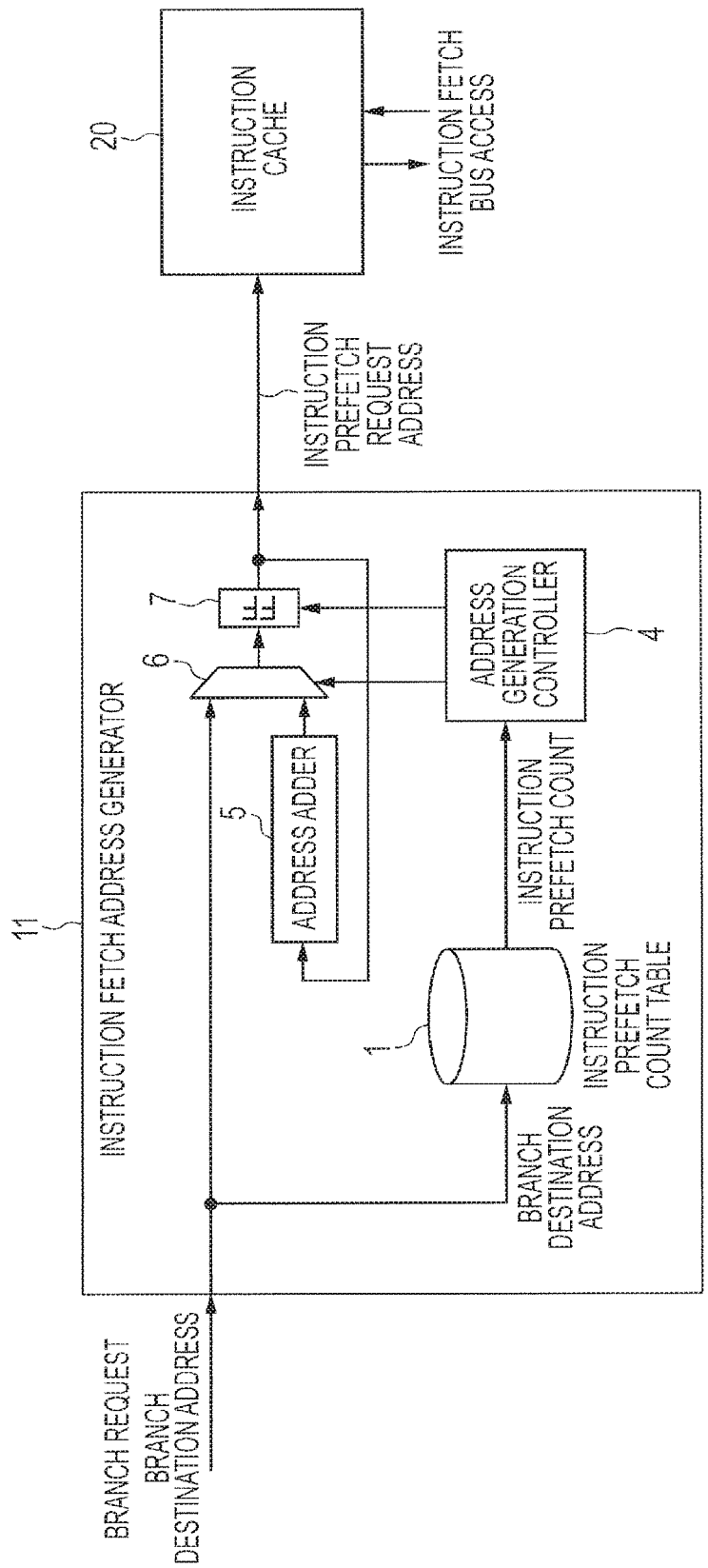
FIG. 4 is a block diagram illustrating an example of the configuration of an instruction fetch address generator of the processor according to the typical embodiment.

FIG. 4 is a block diagram illustrating an example of the configuration of the instruction fetch address generator 11 of the processor 100 according to the typical embodiment. This is an example of the configuration in which the instruction prefetch buffer 20 is realized by the instruction cache 20, the instruction prefetch amount is specified by the count of the cache fill, and the table 1 of FIG. 1 is realized by an instruction prefetch count table 1. The instruction fetch address generator 11 includes a flip-flop 7, a selector 6, an address adder 5, an address generation controller 4, and an instruction prefetch count table 1. When a branch arises in the process execution unit 30, a branch destination address and a branch request are supplied to the instruction fetch address generator 11. The supplied branch destination address is stored in the flip-flop 7 via the selector 6, and is supplied to the instruction cache 20. When the branch destination address hits in the instruction cache 20, the corresponding instruction code is read and supplied to the process execution unit 30. When it is a cache miss, a cache fill is performed, and then the corresponding instruction code is read and supplied to the process execution unit 30.

The branch destination address is incremented by the address adder 5 in parallel to the process described above, and the value stored in the flip-flop 7 is updated. The amount of the increment is equivalent to one cache line. The value incremented from the branch destination address is supplied to the instruction cache 20 as an instruction prefetch request address, and is prefetched from the memory 40 in the case of a cache miss. The address generation controller 4 controls the repetition of the increment operation. In the example of the configuration illustrated in FIG. 4, the instruction prefetch count corresponding to the branch destination address supplied from the process execution unit 30 is read from the instruction prefetch count table 1 and supplied to the address generation controller 4. The address generation controller 4 repeats the increment depending on the instruction prefetch count supplied from the instruction prefetch count table 1, issues an instruction prefetch request address each time, and makes the instruction cache 20 perform instruction prefetch corresponding to the count.

The instruction prefetch count table 1 is an associative memory which refers to the corresponding instruction prefetch count using the branch destination address. The configuration of the instruction prefetch count table 1 may be general full-associative or set-associative.

FIG. 5 is a conceptual diagram illustrating an example of the configuration of the instruction prefetch count table 1 with a full associative memory. The instruction prefetch count table 1 is configured with plural entries, each entry having a valid flag V, a branch destination address as a tag, and a corresponding instruction prefetch count.

Figure 6:
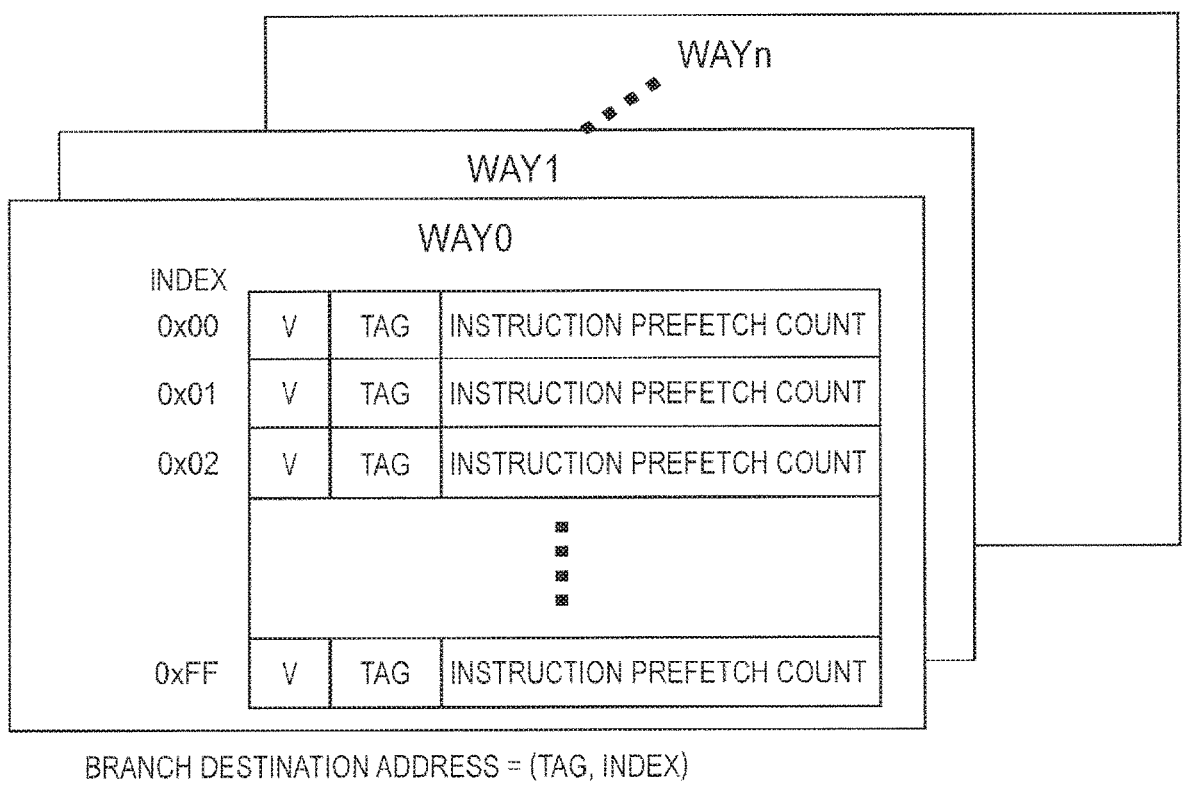
FIG. 6 is a conceptual diagram illustrating an example of the configuration of the instruction prefetch count table with a set associative memory.

FIG. 6 is a conceptual diagram illustrating an example of the configuration of the instruction prefetch count table 1 with a set associative memory. The set associative memory is configured with (n+1) ways WAY0-WAYn, each including plural entries. Each way is configured with 256 entries of indexes 0-0xFF, and each entry is configured with a valid flag V, a tag, and an instruction prefetch count. As for the branch destination address, lower-order 8 bits correspond to an index and high-order bits are stored in the array as a tag.

Figure 7:
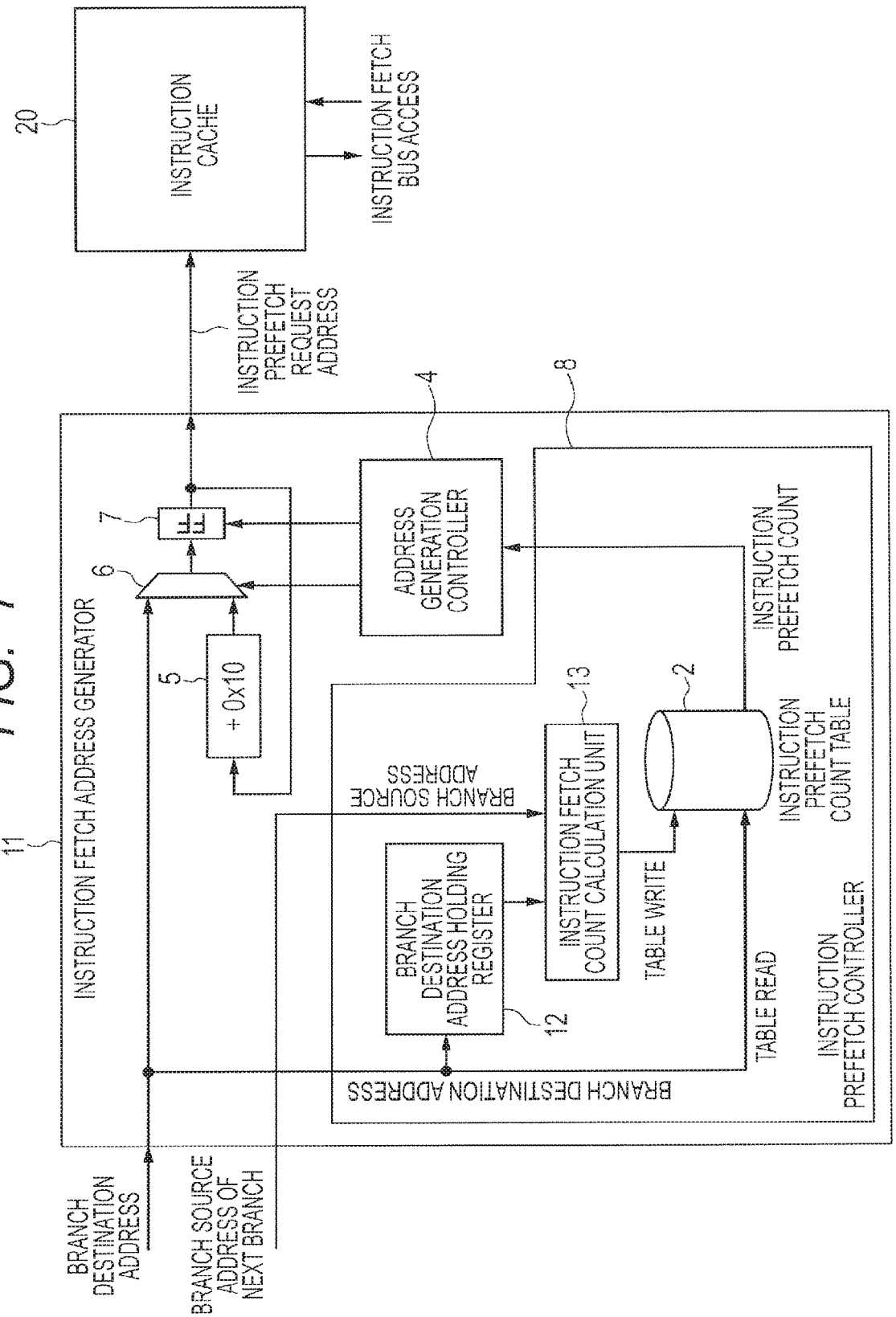
FIG. 7 is a block diagram illustrating an example of the configuration of an instruction fetch address generator according to Embodiment 1.
Figure 15:
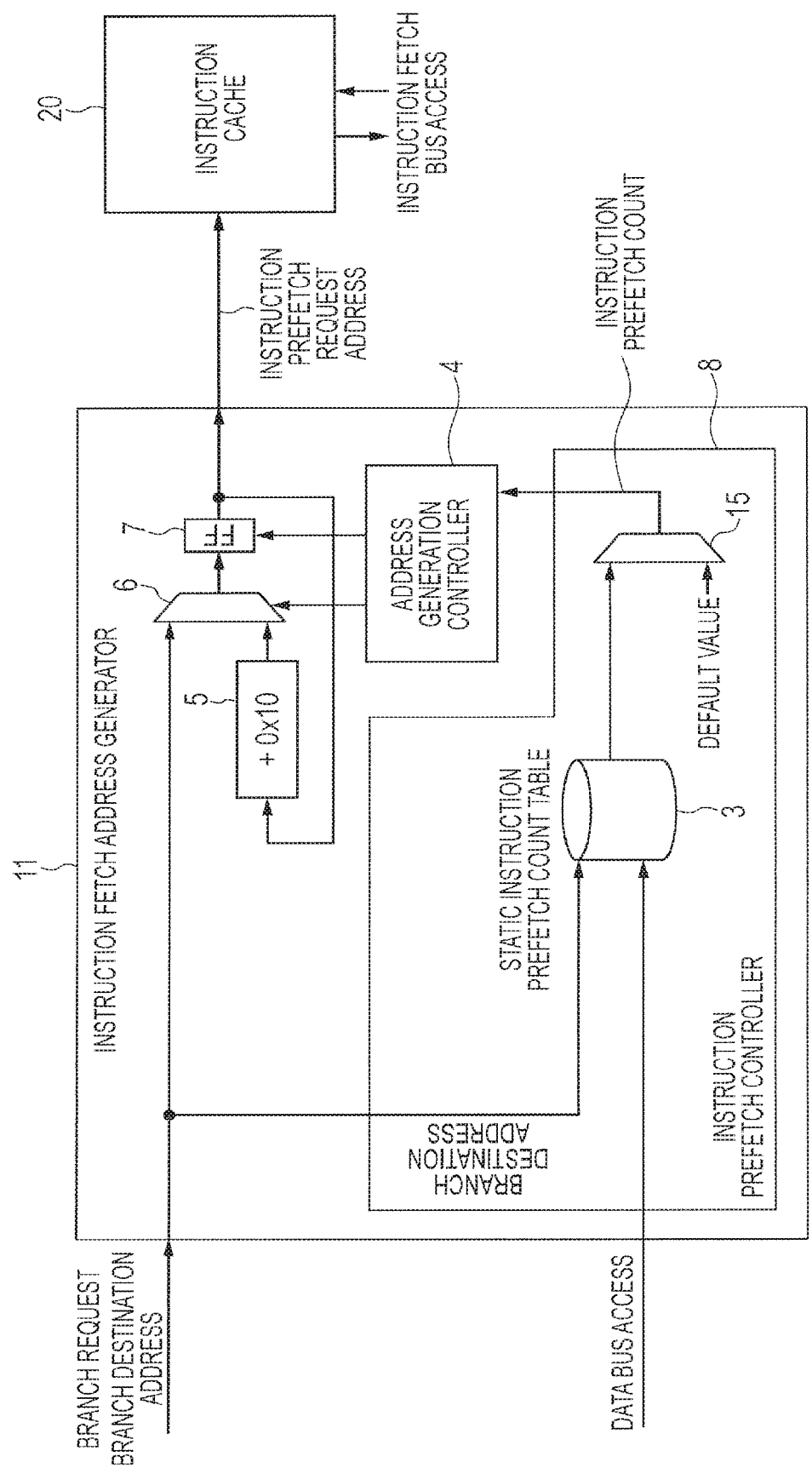
FIG. 15 is a block diagram illustrating an example of the configuration of an instruction fetch address generator according to Embodiment 4.

FIG. 7 is a block diagram illustrating an example of the configuration of the instruction fetch address generator 11 according to Embodiment 1. The instruction fetch address generator 11 includes a flip-flop 7, a selector 6, an address adder 5, an address generation controller 4, and an instruction prefetch controller 8. The instruction prefetch controller 8 is provided with an instruction prefetch count table 2, an instruction fetch count calculation unit 13, and a branch destination address holding register 12. The instruction prefetch count table 2 has function of table write and table read. The table write is the function to write a branch destination address and the corresponding instruction prefetch count into the entry of the instruction prefetch count table 2. The table read is the function to search a branch destination address in agreement with the inputted branch destination address and to read the corresponding instruction prefetch count when it is a cache hit. The branch destination address holding register 12 holds the branch destination address as an address in which the instruction at the head of the branch destination is stored. The instruction prefetch controller 8 is supplied with the branch source address of the next branch. The branch source address of the next branch is the address storing the branch instruction which has generated a branch next to the branch specifying the branch destination address stored in the branch destination address holding register 12. The instruction fetch count calculation unit 13 is supplied with the branch source address of the next branch and the branch destination address held in the branch destination address holding register 12, and performs the table write to the instruction prefetch count table 2. The instruction prefetch count table 2 reads the prefetch count corresponding to the inputted branch destination address, and supplies it to the address generation controller 4. In cases where there is no entry corresponding to the branch destination address, it is preferable to adopt a configuration in which a selector similar to the selector 15 illustrated in FIG. 15 is provided and a default value is supplied by this selector. The default value is given by a fixed value or the register setup, as usual. The configuration and operation of the address generation controller 4, the address adder 5, the selector 6, and the flip-flop 7 are the same as those of the above-described configuration and operation referring to FIG. 4; therefore, the explanation thereof is omitted.

Figure 8:
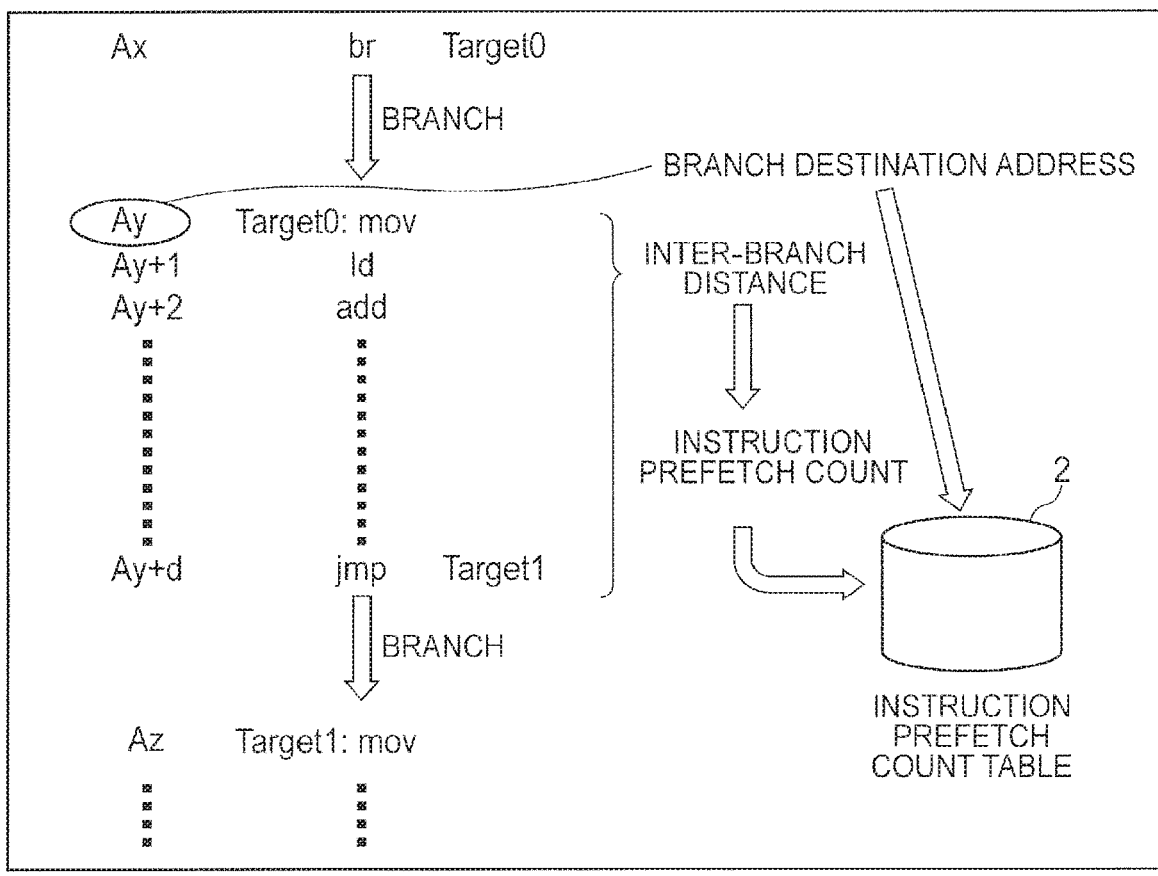
FIG. 8 is an explanatory drawing illustrating schematically the procedure of table write to the instruction prefetch count table.
Figure 9:
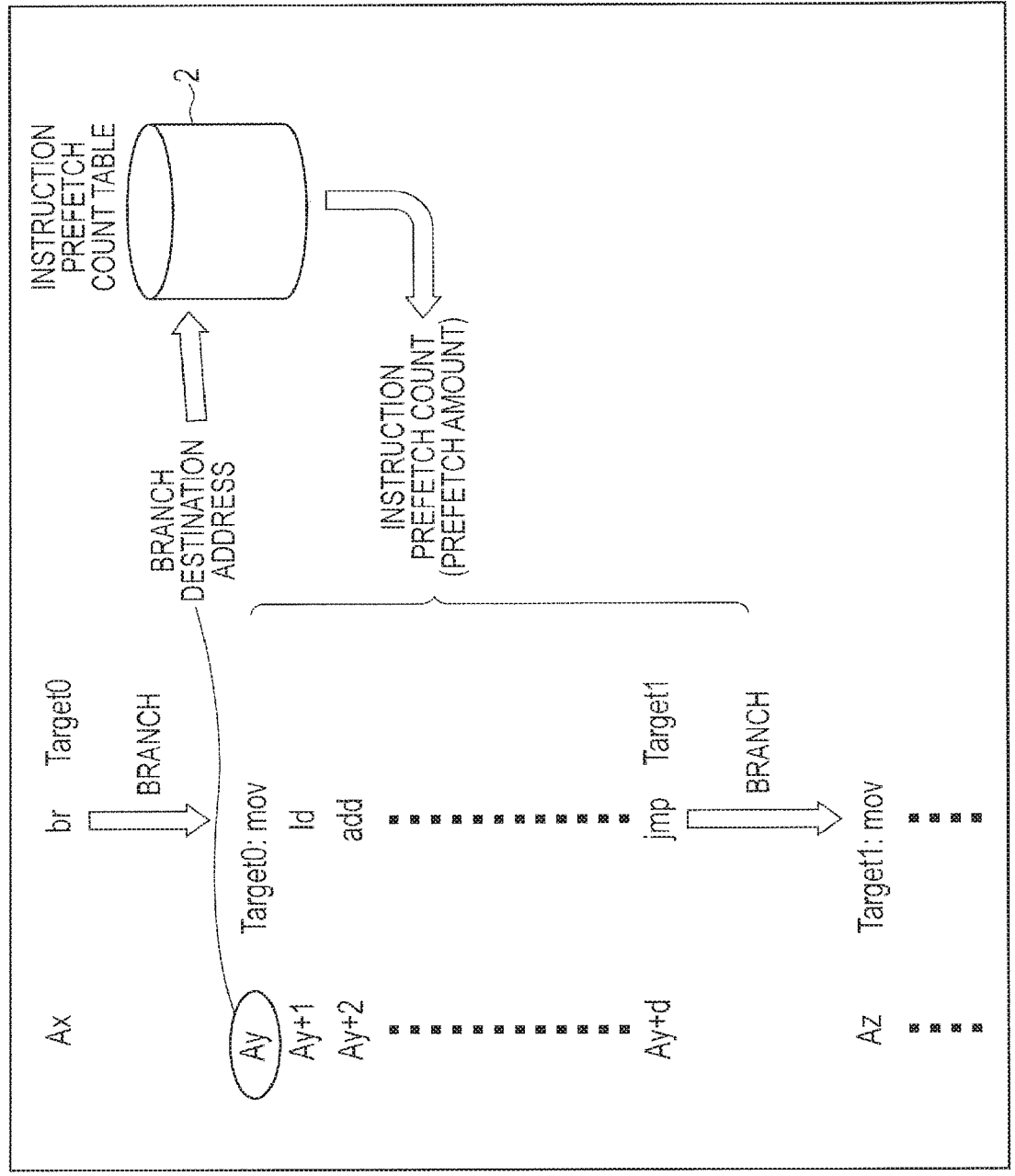
FIG. 9 is an explanatory drawing illustrating schematically the procedure of table read of an instruction fetch count from the instruction prefetch count table.

FIG. 8 and FIG. 9 are explanatory drawings illustrating schematically the procedure of the table write to the instruction prefetch count table 2, and the procedure of the table read of the instruction fetch count, respectively. In FIG. 8 and FIG. 9, the instruction configuring the program to be executed is illustrated in terms of the mnemonic of the assembly language, and the address at which each instruction is stored is illustrated in the head column of each row. At an address Ax, a branch instruction br Target0 with a label Target0 as a branch destination is arranged. At an address Ay indicated by a label Target0 as the branch destination, a move instruction mov is arranged, and at the subsequent addresses Ay+1, Ay+2, . . . , Ay+d, a load instruction ld, an add instruction add, . . . , a jump instruction jump Target1 are arranged sequentially. The jump instruction jump Target1 at the address Ay+d is an unconditional branch instruction to a label Target1. At an address Az indicated by the label Target1 as a branch destination, a move instruction mov is arranged.

The initial state of the instruction prefetch count table 2 is empty for example, that is, the state at which nothing is written. When a branch arises for the first time after the branch instruction br Target0 from the address Ax is executed, the address Ay indicated by the label Target0 becomes a branch destination address, and is stored in the branch destination address holding register 12. Although not illustrated in FIG. 8, the table read at the address Ay as the branch destination address results in a miss hit because the instruction prefetch count table 2 is empty. Subsequently, an instruction is sequentially executed from the address Ay indicated by the label Target0 and a branch to the label Target1 by the jump instruction jump Target1 arises at the address Ay+d. At this time, the address Az indicated by the label Target1 as a branch destination address and the address Ay+d of the jump instruction jump Target1 which has generated a branch as a branch source address of the next branch are supplied respectively to the instruction fetch address generator 11. The instruction fetch count calculation unit 13 is supplied with the branch source address Ay+d of the next branch and the branch destination address Ay from the branch destination address holding register 12, and calculates the inter-branch distance which is the difference (Ay+d−Ay=d). The instruction fetch count calculation unit 13 calculates a suitable instruction prefetch count based on the calculated inter-branch distance, and writes the supplied branch destination address Ay and the calculated instruction prefetch count in an associated manner, into an entry of the instruction prefetch count table 2.

Subsequently, the branch instruction br Target0 at the address Ax is executed again. When a branch for the second time or subsequent ones arises, as illustrated in FIG. 9, an instruction prefetch count corresponding to the branch destination address Ay indicated by the label Target0 is read by the table read from the instruction prefetch count table 2, and the instruction prefetch to the instruction cache 20 is executed. At this time, as illustrated in FIG. 8, the instruction prefetch count corresponding to the branch destination address Ay is calculated so that up to the instruction at the address Ay+d of the jump instruction jump Target1 which generates the next branch may be prefetched and subsequent unnecessary prefetches may not be performed.

FIGS. 8 and 9 illustrate the unconditional branch instruction jump Target1. However, when the branch instruction is a conditional branch instruction, the instruction prefetch count is calculated from the inter-branch distance to the address at which the instruction having actually generated the branch is arranged, and the table write is performed successively. According to this configuration, the instruction prefetch count corresponding to the branch destination address is adaptively learned based on the address at which the next branch actually arises.

Figure 10:
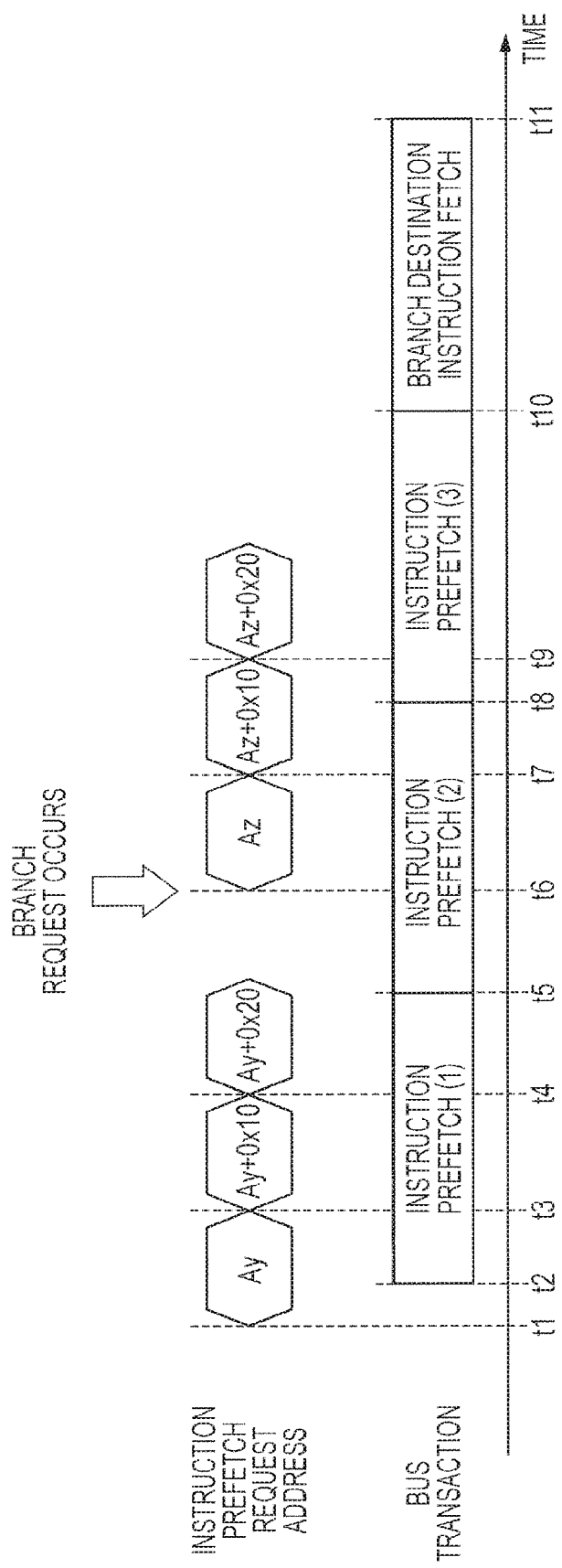
FIG. 10 is a timing chart illustrating schematically an example of operation of a processor of the comparative example.
Figure 11:
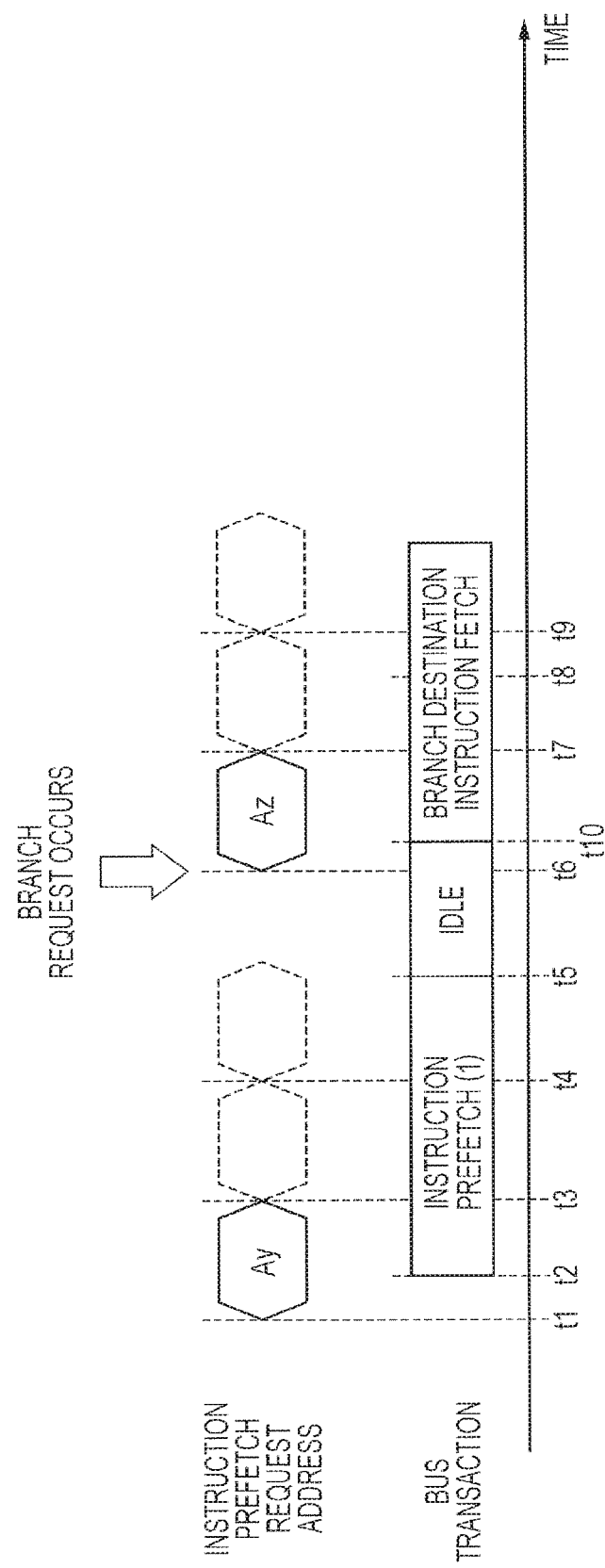
FIG. 11 is a timing chart illustrating schematically an example of operation of the processor according to the typical embodiment.

FIG. 10 and FIG. 11 are timing charts illustrating schematically the example of operation of the processor according to the comparative example and the example of operation of the processor according to the typical embodiment, respectively. The horizontal axis shows the time and the vertical axis direction shows schematically the instruction prefetch request address supplied to the instruction cache 20, and the bus transactions for the accompanying instruction prefetch.

In the processor of the comparative example illustrated in FIG. 10, when a branch destination address Ay is issued as an instruction prefetch request address at time t1, the instruction prefetch (1) for one line including the address Ay is executed for the period of time t2-t5. Subsequently, the instruction fetch unit 10 requests the instruction prefetch of a fixed count. In the example of FIG. 10 two more instruction prefetches are requested, and an address Ay+0x10 and an address Ay+0x20 are sequentially issued at time t3 and t4 as the instruction prefetch request address, respectively. The present example illustrates that the instruction prefetch request address is incremented by 0x10 for every cache line and issued. Following the issue of the instruction prefetch request addresses Ay+0x10 and Ay+0x20, an instruction prefetch (2) including the address Ay+0x10 is executed for the period of time t5-t8, and an instruction prefetch (3) including the address Ay+0x20 is executed for the period of time t8-t10, respectively. In parallel to this, it is assumed that the instruction prefetched by the instruction prefetch (1) is executed, and that a branch request to an address Az arises at time t6. Following this, addresses Az, Az+0x10, and Az+0x20 are sequentially issued at time t6, t7, and t9, as the instruction prefetch request address, respectively. However, the bus 41 is occupied by the instruction prefetch (2) at time t6; therefore, the branch destination instruction fetch which is an instruction prefetch to the address Az is kept waiting till time t10 when the instruction prefetch (3) finishes and the bus is released. Therefore, the processor is forced to keep the execution of the instruction of the address Az waiting.

Also in the example of operation of the processor according to the typical embodiment illustrated in FIG. 11, the branch destination address Ay is issued as an instruction prefetch request address at time t1, and the instruction prefetch (1) for one line including the address Ay is executed during the period of time t2-t5. However, after the branch destination address Ay is issued as the instruction prefetch request address at time t1, the instruction fetch unit 10 requests the instruction prefetch of the count suitable for the branch destination address Ay. In the processor according to the typical embodiment of the present application, when the address at which the next branch arises (the address Ay+d when quoting FIGS. 8 and 9) is included within the range of the instruction prefetch (1), the subsequent instruction prefetch request address is not issued. That is, the instruction prefetch request address is not issued at time t3 and t4. For that reason, when the branch request to the address Az arises at time t6, the bus is in the idle (IDLE) state. Therefore, the branch destination instruction fetch corresponding to the instruction prefetch request address Az issued following the branch to the address Az at time t6 can be immediately started at time t10 after time t6. Therefore, the latency time of the processor accompanying this branch becomes comparable as the ordinary cache miss, and an unnecessary latency time does not occur.

As explained above, it is possible to suppress low the probability of occurrence of the situation where a bus 41 is occupied by the instruction prefetch more than necessary. Accordingly, by stopping the instruction prefetches (2) and (3) which are unnecessary originally, it is possible to reduce the operating power of the bus 41 and the memory 40 as the access destination. Furthermore, as illustrated in FIG. 7, by configuring the instruction prefetch buffer with an instruction cache memory and by including the instruction prefetch count table 2 which learns based on the actually arisen branch, the instruction prefetch count is learned based on the actually arisen branch. Accordingly, it is possible to predict a suitable instruction prefetch amount with a higher degree of accuracy. In addition, the instruction prefetch count is calculated from the difference between the branch destination address and the address at which an instruction of the next arising branch is arranged (the branch source address of the next branch). Accordingly, it is possible to learn the instruction prefetch count correctly.

FIG. 7 illustrates the example that the instruction prefetch buffer includes the instruction cache memory. However, it is not necessary to necessarily configure the instruction prefetch buffer with the cache memory, and a simple FIFO type prefetch buffer may be sufficient. FIG. 7 illustrates the example of the configuration of the processor which includes the instruction prefetch count table 2 learning based on the actually arisen branch. However, a method to calculate the suitable instruction prefetch count corresponding to the branch destination address is not restricted to the configuration illustrated in FIG. 7, but it can be substituted by Embodiment 2 or Embodiment 3 to be described below, for example. Furthermore, not learning based on the actually arisen branch, as will be illustrated in Embodiments 4-6, for example, it is possible to adopt a static table without the premise of learning or to adopt the combination of a dynamic table and a static table.

<A Dynamic Instruction Prefetch Count Table+a Branch Prediction Unit>

Figure 12:
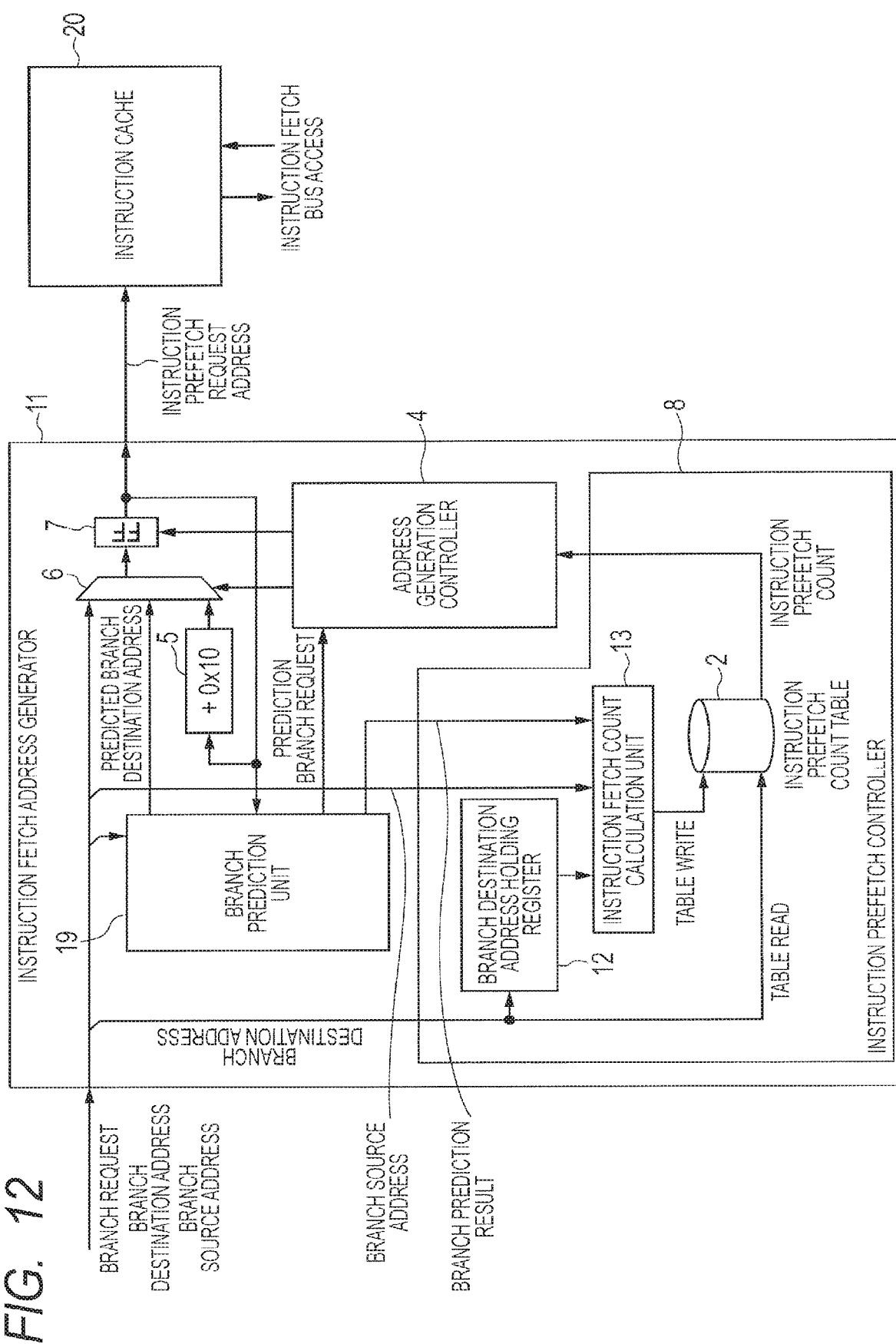
FIG. 12 is a block diagram illustrating another example of the configuration (combination with branch prediction) of the instruction fetch address generator according to Embodiment 1.

FIG. 12 is a block diagram illustrating an example of combination with the branch prediction, as another example of the configuration of the instruction fetch address generator 11 according to Embodiment 1. The instruction fetch address generator includes a branch prediction unit 19 in addition to the configuration illustrated in FIG. 7. The branch prediction is technology which predicts a possible result by the instruction fetch unit 10 before it is determined whether a branch actually arises or not, and when the arising of a branch is predicted, the instruction on the branch destination is fetched on speculation. When the branch prediction is successful, the predicted branch destination address is supplied to the instruction cache 20 as an instruction prefetch request address via the selector 6 and the flip-flop 7. When the branch prediction is successful, the unnecessary speculative instruction fetch as one of the issues described above does not take place. Therefore, in cases where the branch prediction result of the arising of a branch is right, the writing to the instruction prefetch count table 2 is canceled, thereby reducing the occupancy of the entry.

FIG. 12 illustrates an example of the configuration in which the branch prediction unit 19 is incorporated in the instruction fetch address generator 11 according to Embodiment 1 illustrated in FIG. 7. However, it is possible to incorporate similarly the branch prediction unit 19 in the instruction fetch address generator 11 according to arbitrary one of embodiments described in the following.

(Embodiment 2)

<A Branch Request Unit Calculates an Instruction Prefetch Count by a Counter>

Figure 13:
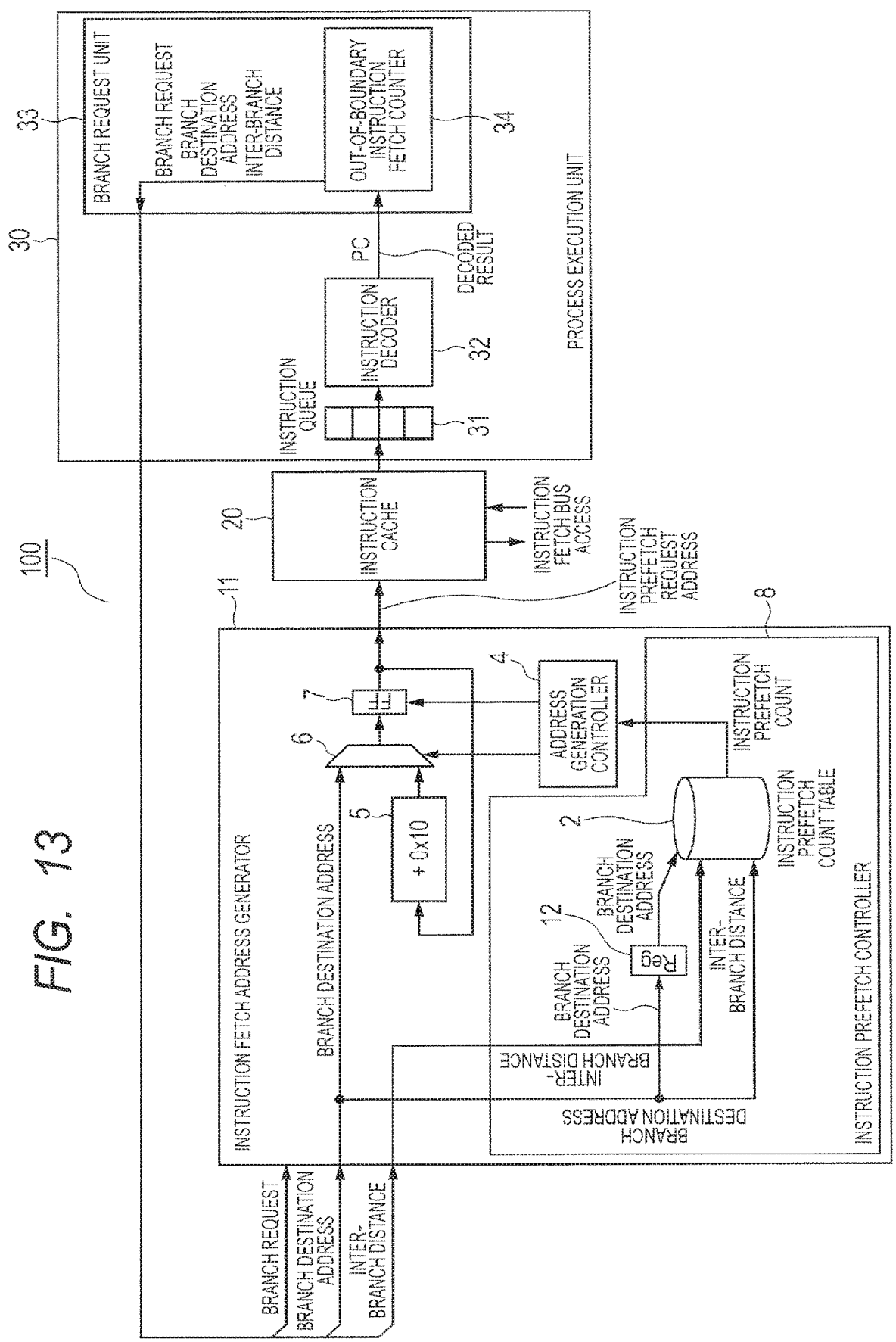
FIG. 13 is a block diagram illustrating an example of the configuration of a processor according to Embodiment 2 and an instruction fetch address generator mounted therein.

FIG. 13 is a block diagram illustrating an example of the configuration of a processor 100 according to Embodiment 2 and an instruction fetch address generator 11 mounted therein. The processor 100 according to Embodiment 1 illustrated in FIG. 7 is an example of the configuration in which the instruction fetch address generator 11 calculates the instruction prefetch count corresponding to the branch destination address. However, in the processor 100 according to Embodiment 2, a circuit to calculate an instruction prefetch count is provided in the process execution unit 30. As is the case with FIG. 1, the processor 100 includes an instruction fetch unit 10, an instruction prefetch buffer 20, a process execution unit 30, and a memory 40, and the instruction prefetch buffer 20 and the memory 40 are coupled mutually via a bus 41. FIG. 13 illustrates only the instruction fetch address generator 11 included in the instruction fetch unit 10, the instruction cache 20 functioning as the instruction prefetch buffer 20, and the process execution unit 30. The other elements are not shown in the figure.

The process execution unit 30 includes an instruction queue 31, an instruction decoder 32, and a branch request unit 33. The branch request unit 33 includes an out-of-boundary instruction fetch counter 34, and supplies a branch request, a branch destination address, and an inter-branch distance to the instruction fetch address generator 11. The branch request unit 33 outputs the branch request and the branch destination address, based on the program counter value PC and the decoded result which are supplied from the instruction decoder 32. The program counter value PC supplied at this time is monitored, and the count of exceeding an instruction fetch boundary without the arising of a branch is counted by the out-of-boundary instruction fetch counter 34. Here, the instruction fetch boundary is an address boundary of the cache line of the instruction cache 20. The program counter value PC is sequentially incremented without the arising of a branch, and the count of exceeding the instruction fetch boundary by the time the next branch arises is an inter-branch distance corresponding to the branch destination address concerned, and it serves as a suitable instruction prefetch count. When a branch arises, the branch request unit 33 outputs the branch destination address of the branch and the branch request. In addition, the branch request unit 33 outputs the count value of the out-of-boundary instruction fetch counter 34 as an inter-branch distance, and resets the out-of-boundary instruction fetch counter 34.

As is the case with FIG. 7, the instruction fetch address generator 11 includes a flip-flop 7, a selector 6, an address adder 5, an address generation controller 4, and an instruction prefetch controller 8. The instruction prefetch controller 8 is provided with an instruction prefetch count table 2 and a branch destination address holding register 12, but not provided with an instruction fetch count calculation unit 13. In the case of the table write when a branch arises, the branch destination address held in the branch destination address holding register 12 and the inter-branch distance supplied from the process execution unit 30 are written in the instruction prefetch count table 2.

Other configurations and operations are the same as those of Embodiment 1 which quotes FIG. 7 and other figures. Therefore, the explanation thereof is omitted.

According to this configuration, the instruction prefetch count is calculated by the counter 34 in the branch request unit 33. Therefore, the instruction fetch count calculation unit 13 in the instruction fetch address generator 11 becomes unnecessary; accordingly, it is possible to learn the instruction prefetch count correctly by small circuit scale.

(Embodiment 3)

<An Instruction Fetch Address Generator Calculates an Instruction Prefetch Count by a Counter>

Figure 14:
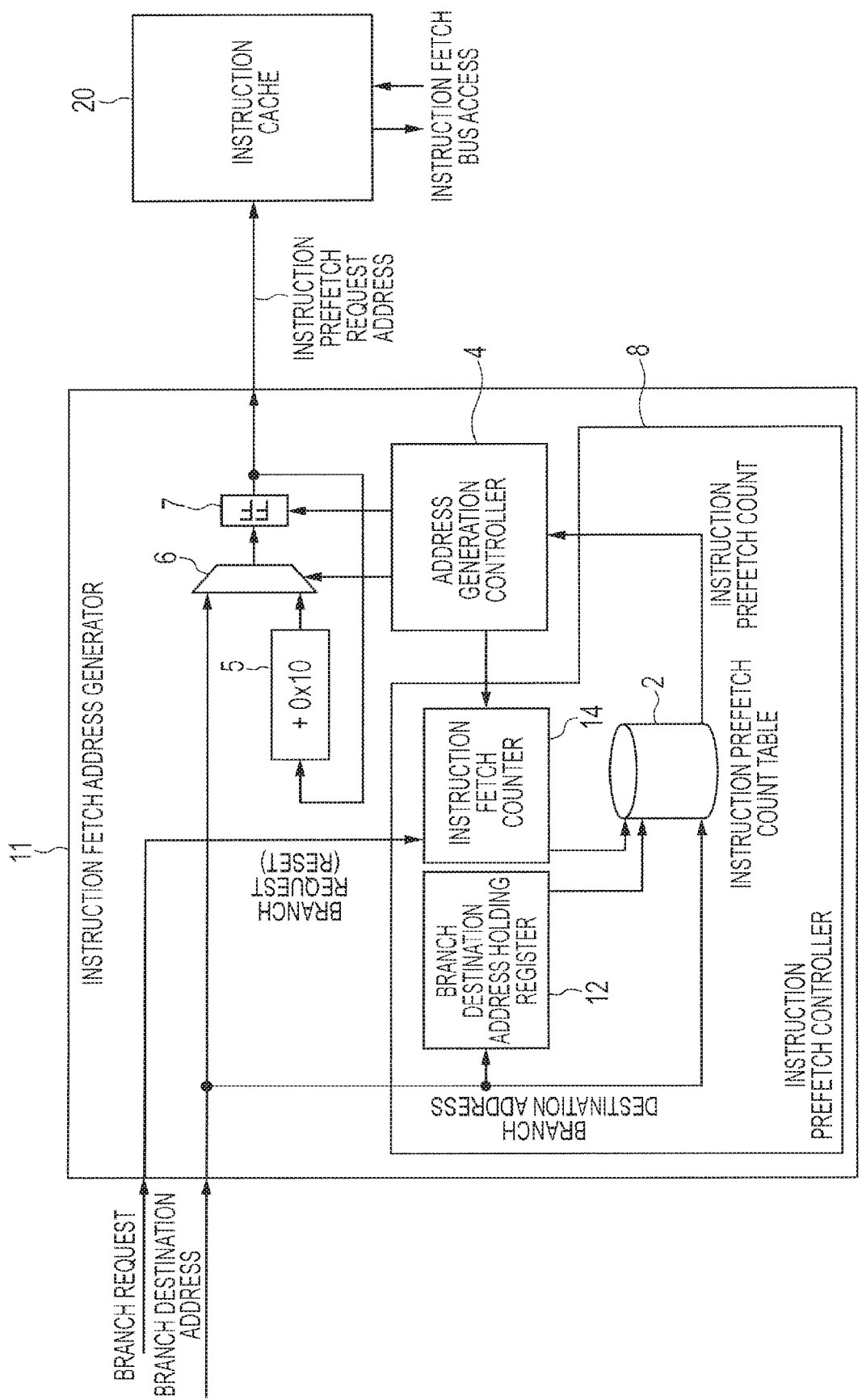
FIG. 14 is a block diagram illustrating an example of the configuration of an instruction fetch address generator according to Embodiment 3.

FIG. 14 is a block diagram illustrating an example of the configuration of an instruction fetch address generator 11 according to Embodiment 3. As substitute for the out-of-boundary instruction fetch counter 34 provided in the branch request unit 33 in FIG. 13, an instruction fetch counter 14 is provided in the instruction fetch controller 8 of the instruction fetch address generator 11. The instruction fetch counter 14 is reset by the branch request which is asserted when a branch arises, and counts the count of issue of the instruction fetch request address requested by the address generation controller 4 by the time the next branch arises. In the case of the table write when a branch arises, the branch destination address held in the branch destination address holding register 12 and the count value of the instruction fetch counter 14 are written in the instruction prefetch count table 2.

Other configurations and operations are the same as those of Embodiment 1 which quotes FIG. 7 and other figures. Therefore, the explanation thereof is omitted.

In the example of the configuration of Embodiment 2, the inter-branch distance is calculated based on the number of instructions of which the instruction decode has been actually performed, and the instruction prefetch count to be learned is calculated. On the contrary, in the example of the configuration of Embodiment 3, the instruction prefetch count to be learned is calculated, based on the count that the instruction prefetch request is issued. Since the instruction prefetch is executed prior to the actual instruction execution, the instruction prefetch count calculated by the example of the configuration of Embodiment 3 may increase compared with the case of Embodiment 2. For example, in the example of the configuration of Embodiment 3, when the instruction prefetch is performed several times, a branch arises in the instruction included in the first prefetch actually. This is the case described above. In the example of the configuration of Embodiment 3, the number of the instruction prefetches requested becomes the instruction prefetch count to be learned. However, in the case of Embodiment 2, the first time prefetch in which a branch actually arises becomes the instruction prefetch count. In this way, more speculative fetch requests take place and more speculative fetches are performed than in the case of Embodiment 2; accordingly, an opportunity to make the instruction cache hit increases, and it is possible to improve the performance rather than in the case of Embodiment 2.

(Embodiment 4)

<A Static Instruction Prefetch Count Table>

Hitherto the explanation is made mainly on the embodiments including the dynamic instruction prefetch count table 2 which calculates the inter-branch distance based on the actually arisen branch and learns adaptively the instruction prefetch count corresponding to the branch destination address. However, it is not that the prefetch count table 1 illustrated in FIG. 1 has to include the dynamic instruction prefetch count table 2.

FIG. 15 is a block diagram illustrating an example of the configuration of an instruction fetch address generator 11 according to Embodiment 4. As is the case with FIG. 7, the instruction fetch address generator 11 includes a flip-flop 7, a selector 6, an address adder 5, an address generation controller 4, and an instruction prefetch controller 8. The instruction prefetch controller 8 is provided with a static instruction prefetch count table 3 and a selector 15 in lieu of the instruction prefetch count table 2. However, unlike with FIG. 7, the branch destination address holding register 12 and the instruction fetch count calculation unit 13 are not provided. The table write to the static instruction prefetch count table 3 is performed by data bus access. That is, a value is written by a store instruction, etc. which the process execution unit 30 executes. By the branch destination address of the actually arisen branch, the corresponding instruction prefetch count is read, the flip-flop 7 and the selector 6 and the address adder 5 are controlled by the address generation controller 4, and the instruction prefetch request of the count of reading is issued to the instruction cache 20. These points are the same as those of the operation explained in Embodiment 1. In cases where the branch destination address of the actually arisen branch does not hit in the static instruction prefetch count table 3, a default value is supplied by the selector 15.

According to this configuration, the instruction fetch address generator 11 does not need to include the learning function. The branch destination address and the corresponding instruction prefetch count are written to the static instruction prefetch count table 3 in the power-on sequence, for example, after calculating in advance each branch destination address, the corresponding inter-branch distance, and the instruction prefetch count, based on the result of off-line analysis of the executable file of the program to be executed. Alternatively, it is also preferable to perform dynamic monitoring by software such as an operating system, to calculate and write a suitable instruction prefetch count.

(Embodiment 5)
<A Static Instruction Prefetch Count Table+a Dynamic Instruction Prefetch Count Table>

It is preferable to provide and use properly both the dynamic instruction prefetch count table 2 and the static instruction prefetch count table 3.

Figure 16:
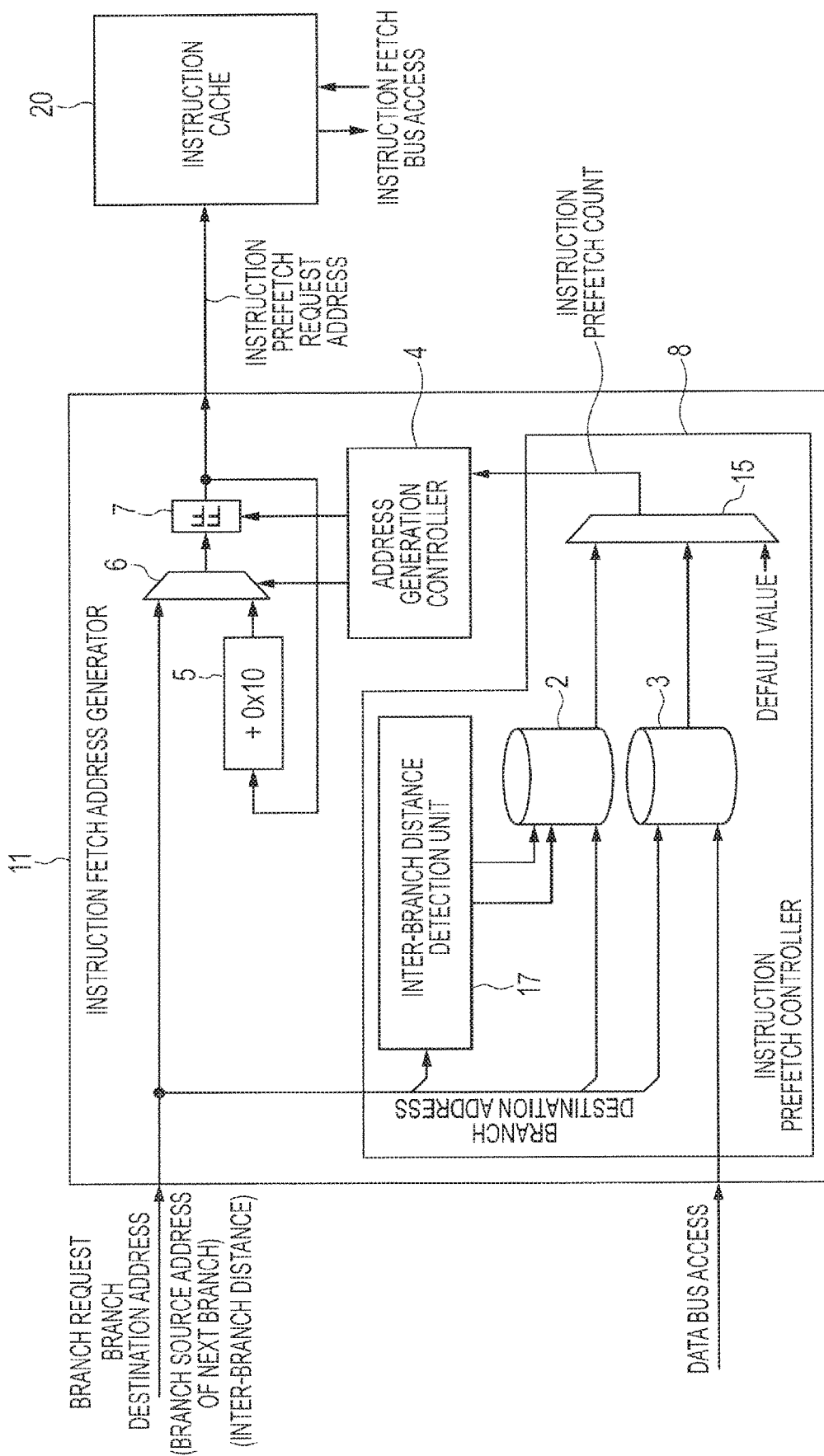
FIG. 16 is a block diagram illustrating an example of the configuration of an instruction fetch address generator according to Embodiment 5.

FIG. 16 is a block diagram illustrating an example of the configuration of an instruction fetch address generator 11 according to Embodiment 5. As is the case with FIG. 15, the instruction fetch address generator 11 includes a flip-flop 7, a selector 6, an address adder 5, an address generation controller 4, and an instruction prefetch controller 8. The instruction prefetch controller 8 is provided with a static instruction prefetch count table 3 and a selector 15 and further provided with an inter-branch distance detection unit 17 and a dynamic instruction prefetch count table 2. The inter-branch distance detection unit 17 is a circuit to calculate an instruction prefetch count suitable for the branch destination address of the actually arisen branch and to perform the table write to the dynamic instruction prefetch count table 2. The inter-branch distance detection unit 17 may be the circuit illustrated in Embodiments 1-3 or other inter-branch distance detection circuit. The selector 15 selects one from the instruction prefetch count read from the dynamic instruction prefetch count table 2, the instruction prefetch count read from the static instruction prefetch count table 3, or a default value, and supplies it to the address generation controller 4.

In performing the table write, it becomes double registration when the entry which is in agreement with the tag currently written in the static instruction prefetch count table 3 is written also in the dynamic instruction prefetch count table 2. In this case, it is possible to control so as to suppress the duplicate writing, by referring to either content with a higher priority at the time of table reference or by confirming the tag of the static instruction prefetch count table 3 at the time of writing in the dynamic instruction prefetch count table 2.

The contents of the table are set to the static instruction prefetch count table 3, for example by software in advance. At the time of requesting a branch, the instruction prefetch count is read from both the dynamic instruction prefetch count table 2 and the static instruction prefetch count table 3, and the selector 15 selects either. If there is no hit in any of the instruction prefetch count tables, the selector 15 selects a default value. It is preferable that the selection by the selector 15 is controlled by the algorithm which utilizes the branch classifications, such as ordinary branch/interruption/exception. The information on the branch destination address and the corresponding instruction prefetch count, accompanying an interruption and an exception handler, will spill out from the dynamic instruction prefetch count table 2, if the interruption or the branch to the exception handler does not arise frequently. However, the instruction prefetch count can be more effectively optimized by employing the contents of the static instruction prefetch count table 2 about what the inter-branch distance is known statically.

Embodiments 1-3 illustrate the mode in which the initial state of the dynamic instruction prefetch count table 2 is empty. However, it is also preferable to adopt the mode in which, as described above, what the inter-branch distance is known statically is written in as an initial state at the time of power-on. According to this configuration, it is possible to avoid the unnecessary occupancy of the bus 41 by the instruction prefetch as for the branch before the dynamic instruction prefetch count table 2 learns.

(Embodiment 6)
<An Instruction Prefetch Count Table is an Associative Memory with a Mask>

Figure 17:
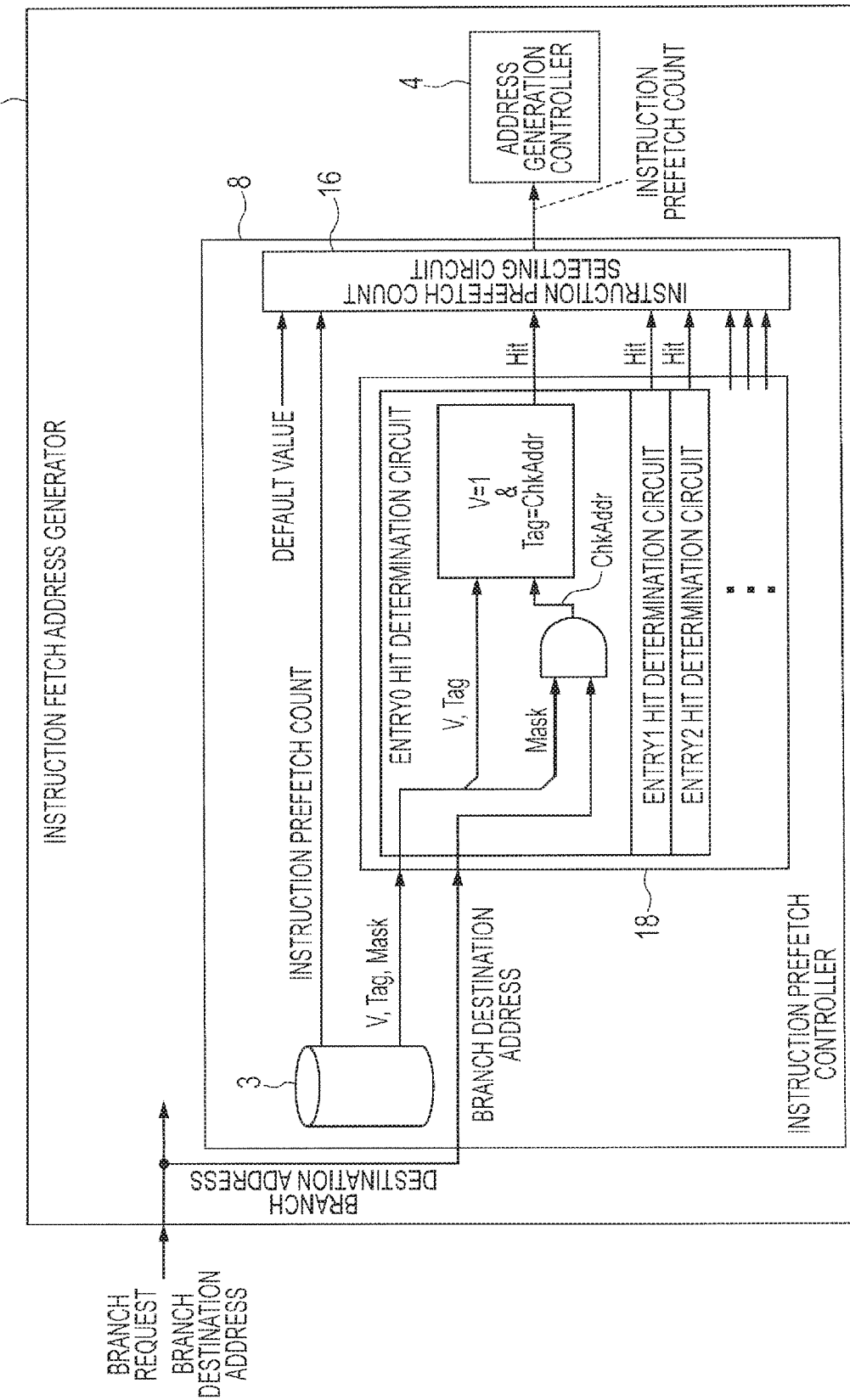
FIG. 17 is a block diagram illustrating an example of the configuration of an instruction fetch address generator according to Embodiment 6.

FIG. 17 is a block diagram illustrating an example of the configuration of an instruction fetch address generator 11 according to Embodiment 6. As is the case with FIG. 15, the instruction fetch address generator 11 includes a flip-flop 7, a selector 6, an address adder 5, an address generation controller 4, and an instruction prefetch controller 8. However, elements other than the instruction prefetch controller 8 and the address generation controller 4 are not shown in the figure. The instruction prefetch controller 8 is provided with a static instruction prefetch count table 3, plural entry hit determination circuits 18, and an instruction prefetch count selecting circuit 16.

FIG. 18 is an explanatory drawing illustrating an example of the configuration of the entry in the associative memory of the static instruction prefetch count table 3 mounted in the instruction fetch address generator 11 according to Embodiment 6. The static instruction prefetch count table 3 is configured with plural entries, each entry including a valid flag V, a tag (Tag), a corresponding instruction prefetch count, and an additional mask (Mask) field.

When inputting the branch destination address and referring to the static instruction prefetch count table 3 at the time of a branch request, the entry hit determination circuit 18 provided for every entry generates a check address (ChkAddr) with a branch destination address and a mask (Mask) field, and performs the coincidence comparison of the check address (ChkAddr) and the tag (Tag). That is, among the bits which configure the inputted branch destination address, a part of the bits are cancelled (masked) by the mask (Mask) field and the remaining effective bits are compared with the tag. The instruction prefetch count selecting circuit 16 selects the instruction prefetch count stored in the hit entry, and supplies it to the address generation controller 4.

Plural branch destination addresses which output the same instruction prefetch count can be collectively registered to one entry. Accordingly, it is possible to suppress small the circuit scale (number of entry) of the static instruction prefetch count table 3.

(Embodiment 7)

<An Instruction Code Generation Device (a Compiler+a Linker)>

Figure 19:
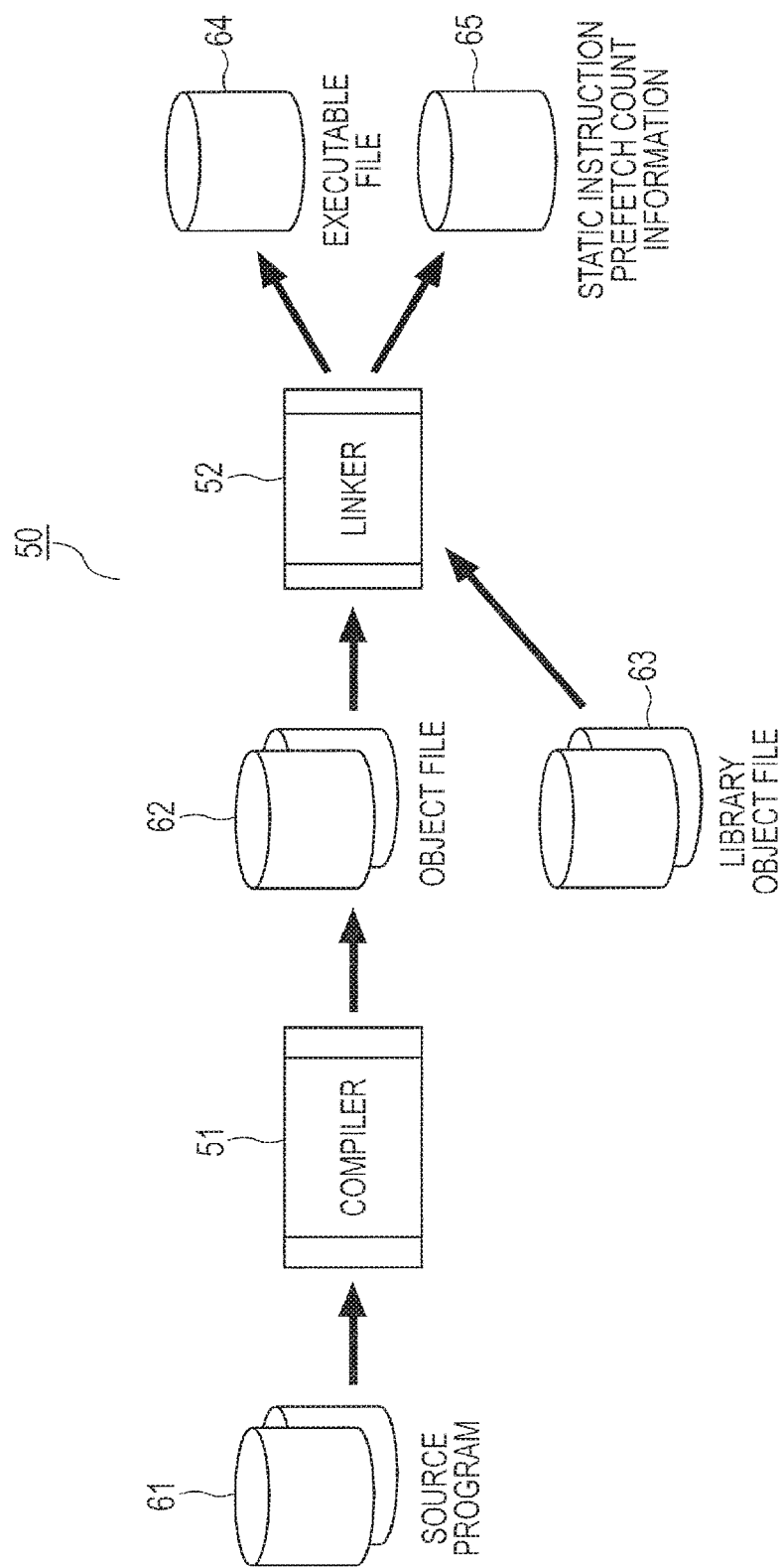
FIG. 19 is an explanatory drawing illustrating schematically an example of the configuration of an instruction code generation device according to Embodiment 7.

FIG. 19 is an explanatory drawing illustrating schematically an example of the configuration of an instruction code generation device 50 according to Embodiment 7. The instruction code generation device 50 generates an instruction code of a program executed by the processor 100 explained in Embodiments 1-6. Although not restricted in particular, the instruction code generation device 50 includes, for example, a compiler 51 and a linker 52. The compiler 51 is supplied with a program 61 described in the high level language, and generates an object file 62. The linker 52 generates an executable instruction code (executable file) 64 from the object file 62 generated by the compiler 51 and a library object file 63 held at the instruction code generation device 50.

In Embodiment 7, the instruction code generation device 50 further calculates and outputs static instruction prefetch count information 65. The calculation method is to analyze an instruction code to which address mapping has been performed, for example. When each routine included in the object file 62 is mapped into the address space, as for the branch instruction included in the routine, the linker 52 calculates the distance from a branch destination address to an address at which another branch instruction is arranged for the first time after then, as an inter-branch distance, and calculates the static instruction prefetch count information 65 based on the inter-branch distance.

The calculated static instruction prefetch count information 65 is written in the static instruction prefetch count table 3 mounted in the processor 100 explained in Embodiments 4-6.

Alternatively, the calculated static instruction prefetch count information 65 may be written in the dynamic instruction prefetch count table 2 mounted in the processor 100 explained in Embodiments 1-3 and 5, as the initial value.

<Cooperation with an Instruction Prefetch Count Table by an Associative Memory with a Mask>

In cases where the static instruction prefetch count table 3 is configured with an associative memory with a mask (Mask) field as explained in Embodiment 6, it is preferable that the instruction code generation device 50 has the following functions in order to make full use of the feature.

Figure 20:
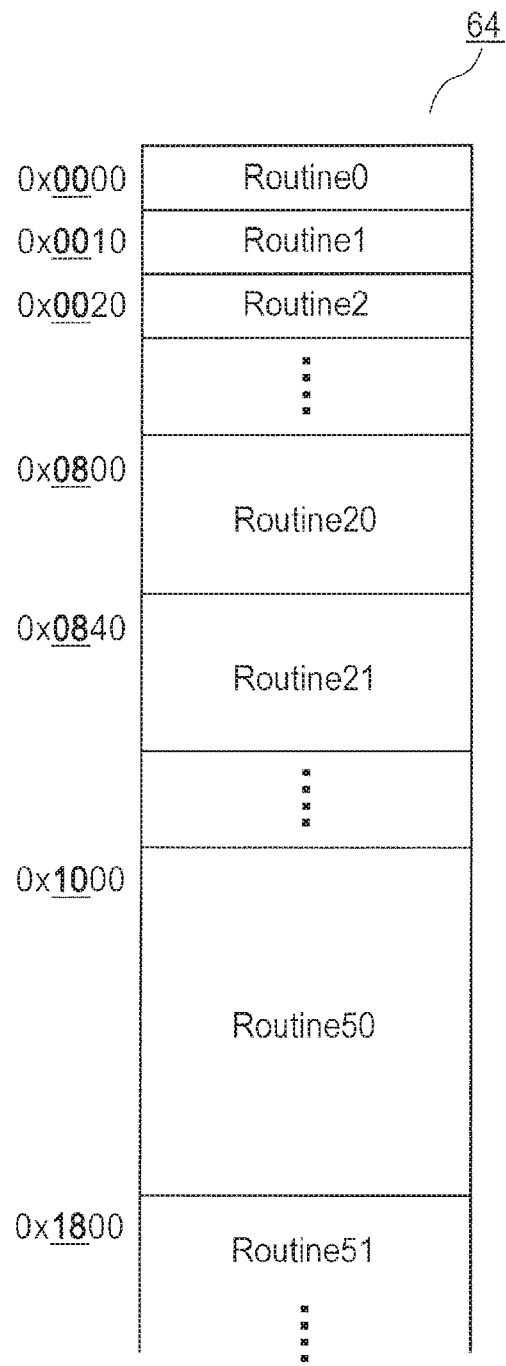
FIG. 20 is an explanatory drawing illustrating schematically an example of an executable file generated by a linker.

FIG. 20 is an explanatory drawing illustrating schematically an example of the executable file 64 generated by the linker 52. When generating the executable file 64 by the linker 52, plural routines which have similar sizes or the same optimal instruction prefetch count are mapped collectively in a mutually near address area. The executable file 64 illustrated is an example in which the small-size routines are mapped at the lower-order address and the large-size routines are mapped at the higher-order address. A routine 0 (Routine0), a routine 1 (Routine1), and a routine 2 (Routine2) are mapped at an address 0x0000, an address 0x0010, and an address 0x0020, respectively. These routines 0-2 (Routine0-Routine2) are small-size routines with the inter-branch distance of less than 16 addresses and the suitable instruction prefetch count of 1, for example. A routine 20 (Routine20) and a routine 21 (Routine21) are mapped at an address 0x0800 and an address 0x0840, respectively. These routines 20-21 (Routine20-Routine21) are middle-size routines with the inter-branch distance of less than 1024 addresses and the suitable instruction prefetch count of 4, for example. A routine 50 (Routine50) and a routine 51 (Routine51) are mapped at an address 0x1000 and an address 0x1800, respectively. These routines 50-51 (Routine50-Routine51) are large-size routines with the inter-branch distance of near 2024 addresses.

Figure 21:
FIG. 21 is an explanatory drawing illustrating schematically an example of the instruction prefetch count information generated by the linker.

FIG. 21 is an explanatory drawing illustrating schematically an example of the static instruction prefetch count information 65 generated by the linker 52. The above-described instruction prefetch counts obtained by mapping of the executable file 64 are outputted as the static instruction prefetch count information 65 with the tag (Tag) field and the mask (Mask) field illustrated in Embodiment 6. It is possible to perform a suitable instruction prefetch by transmitting the static instruction prefetch count information 65 to the static instruction fetch count table 3 with the mask (Mask) field illustrated in Embodiment 6, at the time of starting the program execution.

The entry at the first row illustrated in FIG. 21 having the tag (Tag)=0x00, the mask (Mask)=0xFC, and the instruction prefetch count=1 is masked at the low-order 2 bits by the mask (Mask)=0xFC, hits the branch destination address of which the high order is the tag (Tag)=0x00, and outputs the instruction prefetch count=1. In the example illustrated in FIG. 20, the leading addresses 0x0000, 0x0010, and 0x0020 of the routine 0 (Routine0), the routine 1 (Routine1), and the routine 2 (Routine2) are respective branch destination address, and all satisfy the above-described conditions. Therefore, they hit the entry of the first row illustrated in FIG. 21, and the instruction prefetch count=1 is read. The entry at the second row illustrated in FIG. 21 having the tag (Tag)=0x08, the mask (Mask)=0xF8, and the instruction prefetch count=4 is masked at the low-order 3 bits by the mask (Mask)=0xF8, hits the branch destination address of which the high order is the tag (Tag)=0x08, and outputs the instruction prefetch count=4. In the example illustrated in FIG. 20, the leading addresses 0x0800 and 0x0840 of the routine 20 (Routine20) and the routine 21 (Routine21) are respective branch destination address, and all satisfy the above-described conditions. Therefore, they hit the entry of the second row illustrated in FIG. 21, and the instruction prefetch count=4 is read. In this way, for the entry of the first row, the instruction prefetch count corresponding to at least three different branch destination addresses is collectively registered, and for the entry of the second row, the instruction prefetch count corresponding to at least two different branch destination addresses is collectively registered. Therefore, it is possible to suppress small the circuit scale (the number of the entry) of the static instruction prefetch count table 3.

When the executable file 64 is generated by the linker 52, routines which have similar sizes or the same optimal instruction prefetch count are mapped collectively in a mutually near address area. Therefore, the number of the routines which can be registered into one entry is maximized.

The present embodiment illustrates the example in which the function to generate the instruction prefetch count information 65 is added to the linker 52. Such a function may be provided as plug-in software added to an ordinary linker, or may be provided as independent software in which an executable file 64 generated by an ordinary linker is inputted.

As described above, the invention accomplished by the present inventors has been concretely explained based on the embodiments. However, it cannot be overemphasized that the present invention is not restricted to the embodiments as described above, and it can be changed variously in the range which does not deviate from the gist.

For example, the division of the functional blocks in the block diagrams quoted in Embodiments 1-6 and the naming to the functional blocks are only for the sake of convenience. Accordingly, in the range which does not deviate from the gist as the whole, it is possible to properly unify, split or reorganize the function implemented in the functional blocks, and to change the name in connection with this. Only the configuration with the instruction cache, the bus, and the memory has been illustrated as the processor 100. However, it is possible to change the configuration to a multi hierarchical cache memory, a unified cache which does not separate an instruction and data, and a hierarchical bus architecture, and to properly mount other functional blocks which are generally mounted in a processor.

What is claimed is:

1. A processor comprising:
    a table that stores an instruction prefetch amount which is based on a branch instruction; and
    an instruction prefetch buffer that fetches instructions from a memory based on the instruction prefetch amount,
    wherein when a first branch arises by the branch instruction, the instruction prefetch amount corresponding to a branch destination address of the branch is rewritten based on a difference between the branch destination address of the first branch and an address of a second branch to be arisen subsequent to the first branch.

2. The processor according to claim 1, further comprising:
    an instruction fetch address generator that generates an address based on the instruction prefetch amount.

3. The processor according to claim 1, wherein the prefetch buffer is a cache memory.

4. The processor according to claim 1, wherein the instruction prefetch amount is changed by an execution result of the branch instruction.

5. The processor according to claim 1, wherein the table stores a plurality of instruction prefetch amounts and each of the instruction prefetch amounts is associated a branch instruction, respectively.

6. The processor according to claim 2,
    wherein the instruction fetch address generator further comprises a branch prediction unit, and
    wherein when a branch prediction by the branch prediction unit is successful, the instruction fetch address generator stops rewriting the instruction prefetch amount corresponding to the branch destination address to the table.

* * * * *